United States Patent
Yoon et al.

(10) Patent No.: US 12,471,117 B2
(45) Date of Patent: Nov. 11, 2025

(54) DATA TRANSMISSION/RECEPTION METHOD, DEVICE, AND SYSTEM IN WIRELESS COMMUNICATION SYSTEM

(71) Applicant: WILUS INSTITUTE OF STANDARDS AND TECHNOLOGY INC., Gyeonggi-do (KR)

(72) Inventors: Youngjoon Yoon, Gyeonggi-do (KR);
Minseok Noh, Gyeonggi-do (KR);
Juhyung Son, Gyeonggi-do (KR);
Geunyoung Seok, Gyeonggi-do (KR);
Jinsam Kwak, Gyeonggi-do (KR)

(73) Assignee: WILUS INSTITUTE OF STANDARDS AND TECHNOLOGY INC., Gyeonggi-do (KR)

(*) Notice: Subject to any disclaimer, the term of this patent is extended or adjusted under 35 U.S.C. 154(b) by 0 days.

(21) Appl. No.: 19/198,129

(22) Filed: May 5, 2025

(65) Prior Publication Data
US 2025/0267685 A1 Aug. 21, 2025

Related U.S. Application Data

(63) Continuation of application No. PCT/KR2023/017693, filed on Nov. 6, 2023.

(30) Foreign Application Priority Data

Nov. 4, 2022 (KR) .................... 10-2022-0146547
May 14, 2023 (KR) .................... 10-2023-0062099

(51) Int. Cl.
*H04W 72/25* (2023.01)
*H04B 10/294* (2013.01)
(Continued)

(52) U.S. Cl.
CPC ........ *H04W 72/25* (2023.01); *H04B 10/2942* (2013.01); *H04L 27/26025* (2021.01); *H04W 52/0235* (2013.01)

(58) Field of Classification Search
USPC .... 370/229, 230, 230.1, 236, 252, 311, 318, 370/328, 329, 330, 436, 437, 445, 458,
(Continued)

(56) References Cited

U.S. PATENT DOCUMENTS

2020/0296692 A1* 9/2020 Lee ................. H04W 52/383
2021/0022171 A1 1/2021 Zacharias et al.
(Continued)

FOREIGN PATENT DOCUMENTS

KR 10-2021-0042345 4/2021
KR 10-2022-0100895 7/2022
(Continued)

OTHER PUBLICATIONS

International Search Report for PCT/KR2023/017693 mailed on Feb. 19, 2024 and its English translation from WIPO (published as WO2024/096722).
(Continued)

*Primary Examiner* — Nguyen H Ngo
(74) *Attorney, Agent, or Firm* — WOMBLE BOND DICKINSON (US) LLP

(57) ABSTRACT

Disclosed is a method by which a terminal transmits a signal in a wireless communication system. The terminal can receive configuration information for setting a first subcarrier spacing (SCS) for a plurality of slots, and transmit a physical sidelink shared channel (PSSCH) in the plurality of slots. At this time, if the terminal coexists with a legacy terminal in a co-channel and the plurality of slots fully overlap a legacy subframe of the legacy terminal, second transmission power in at least one slot that excludes a first slot from among the plurality of slots can be limited by means of first transmission power of the first slot.

14 Claims, 34 Drawing Sheets

(51) Int. Cl.
*H04L 27/26* (2006.01)
*H04W 52/02* (2009.01)

(58) Field of Classification Search
USPC .................................................. 370/459, 468
See application file for complete search history.

(56) References Cited

U.S. PATENT DOCUMENTS

| | | | | |
|---|---|---|---|---|
| 2023/0300801 A1* | 9/2023 | Fouad | ................... | H04W 72/02 |
| | | | | 370/329 |
| 2023/0319648 A1* | 10/2023 | Nguyen | ................ | H04W 24/10 |
| | | | | 370/329 |
| 2025/0185047 A1* | 6/2025 | Shimizu | ............ | H04W 74/0808 |

FOREIGN PATENT DOCUMENTS

| | | |
|---|---|---|
| KR | 10-2022-0103724 | 7/2022 |
| WO | 2022/077326 | 4/2022 |
| WO | 2023/191485 | 10/2023 |
| WO | 2024/096722 | 5/2024 |

OTHER PUBLICATIONS

Written Opinion of the International Searching Authority for PCT/KR2023/017693 mailed on Feb. 19, 2024 and its English translation by Google Translate (published as WO2024/096722).

* cited by examiner

[Fig. 1]
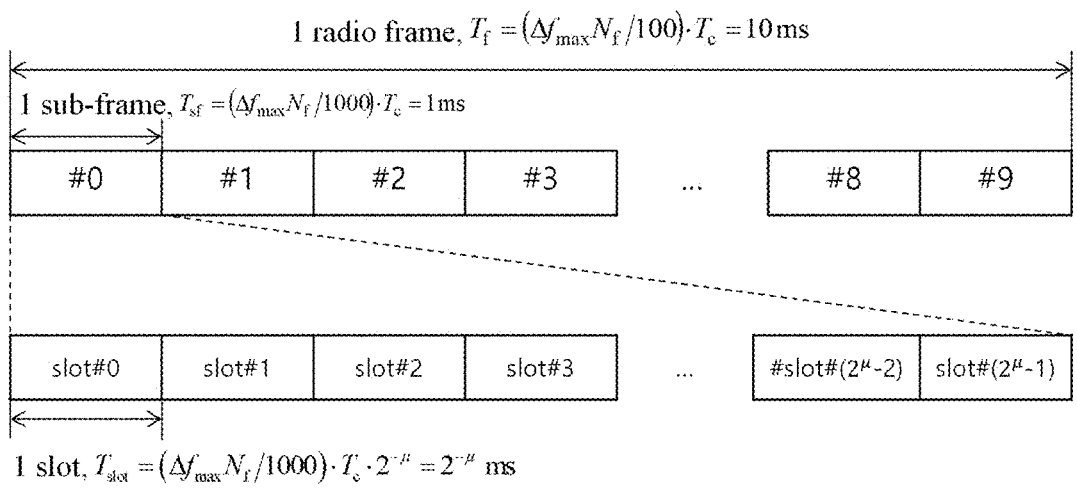

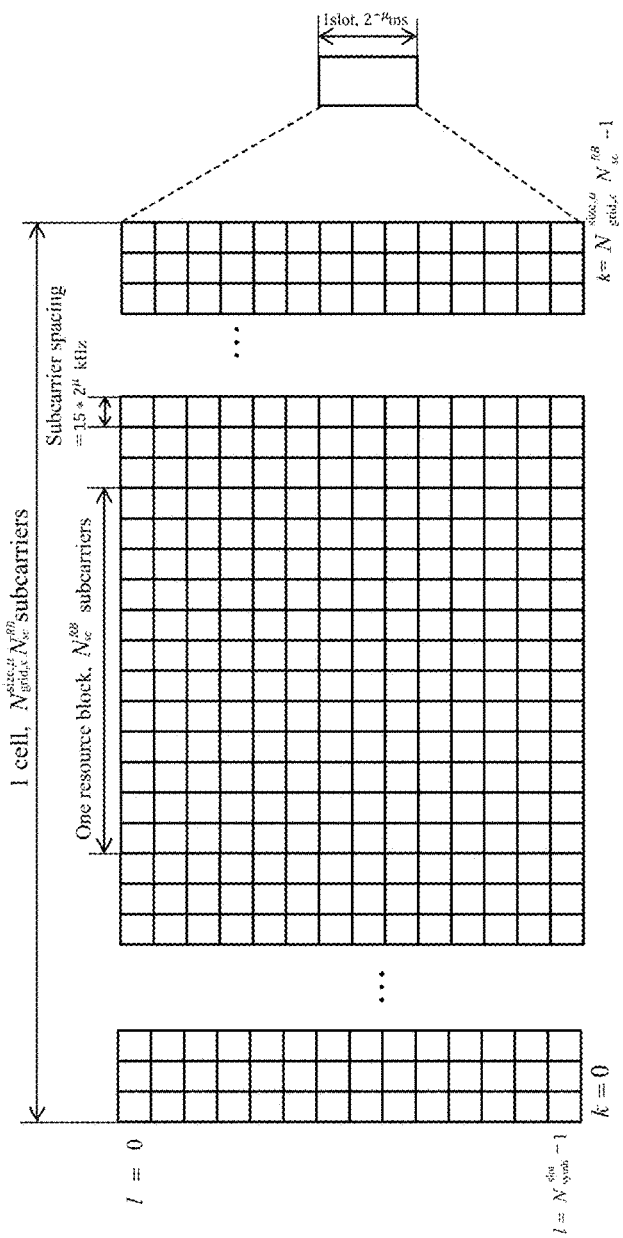
[Fig. 2]

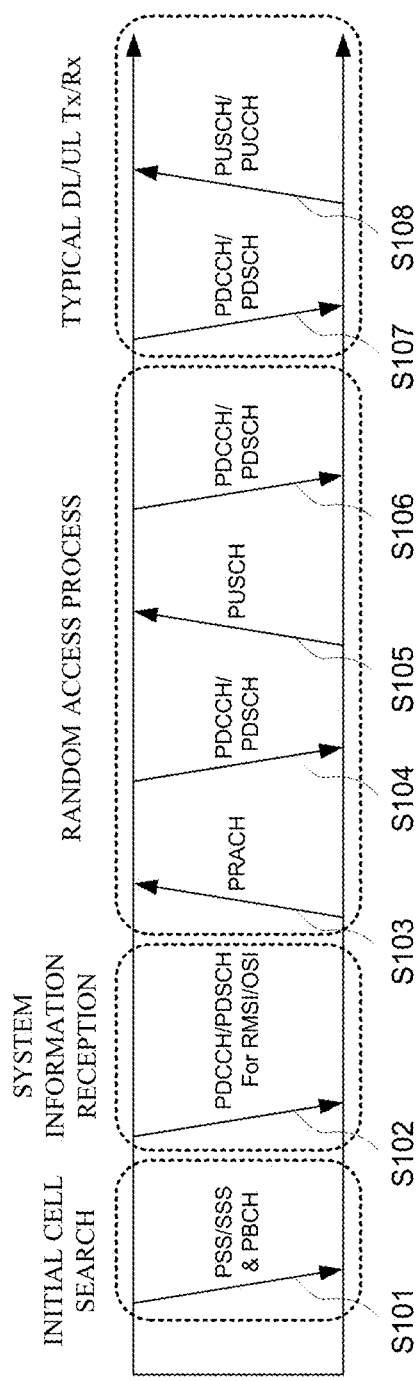
[Fig. 3]

[Fig. 4]
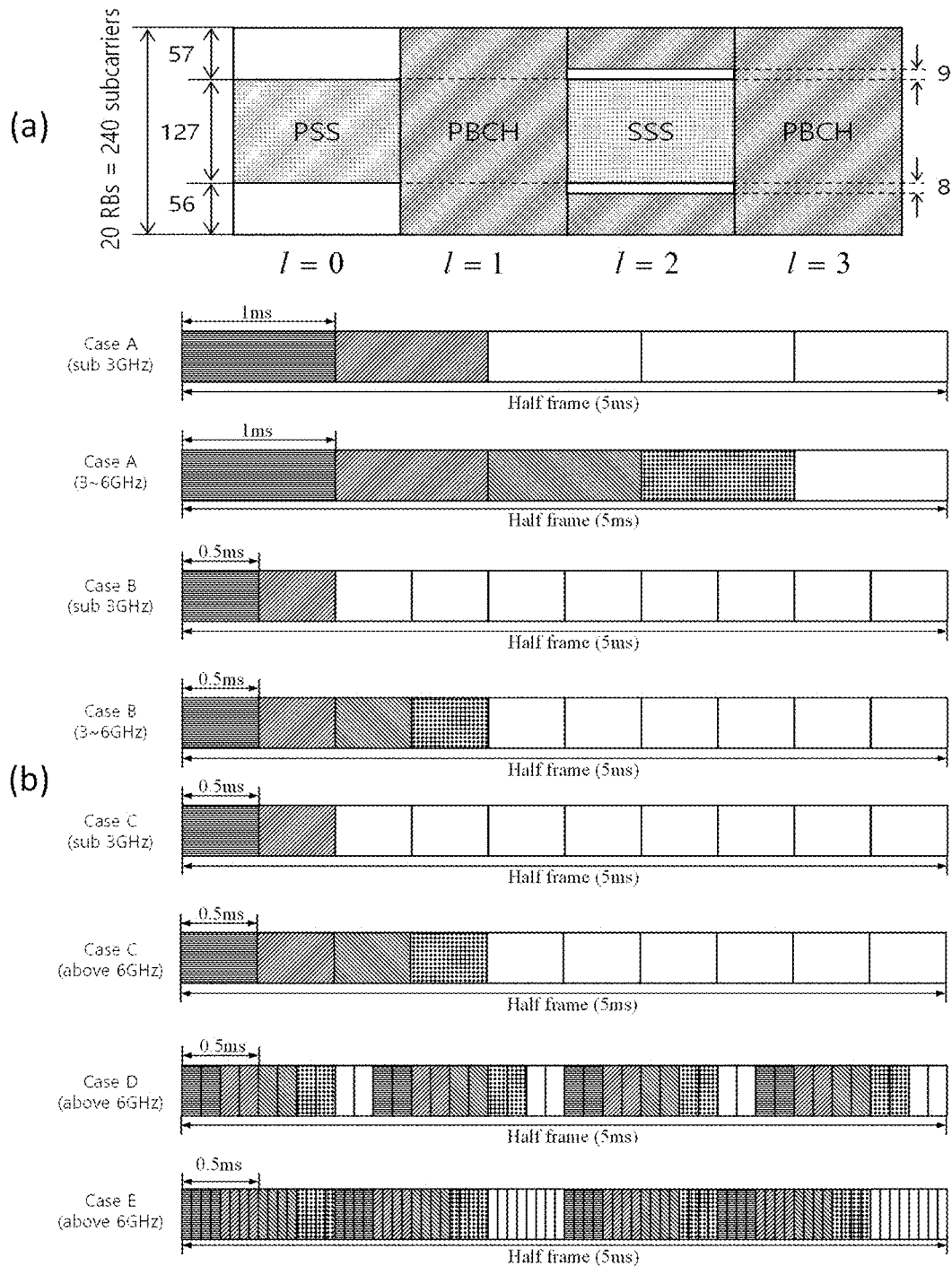

[Fig. 5]
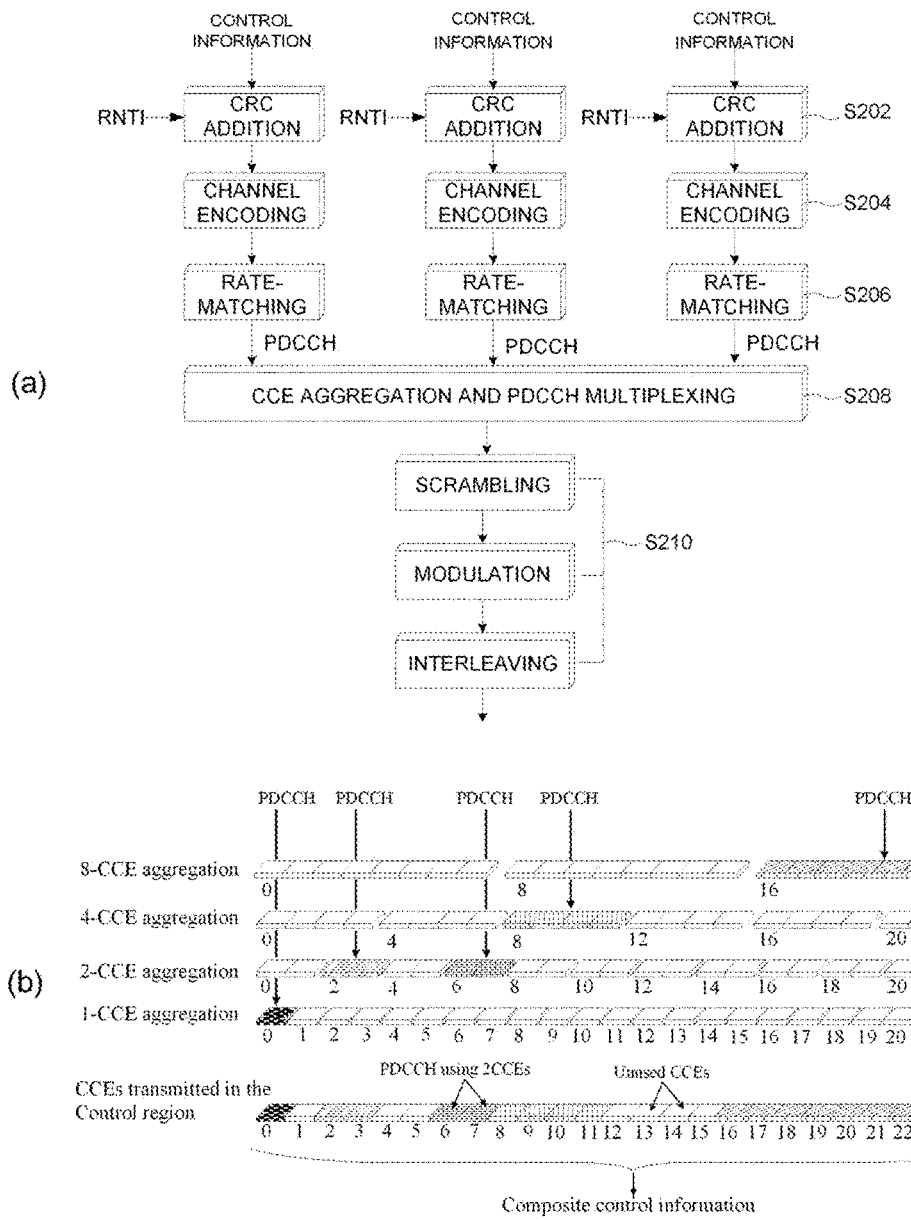

[Fig. 6]
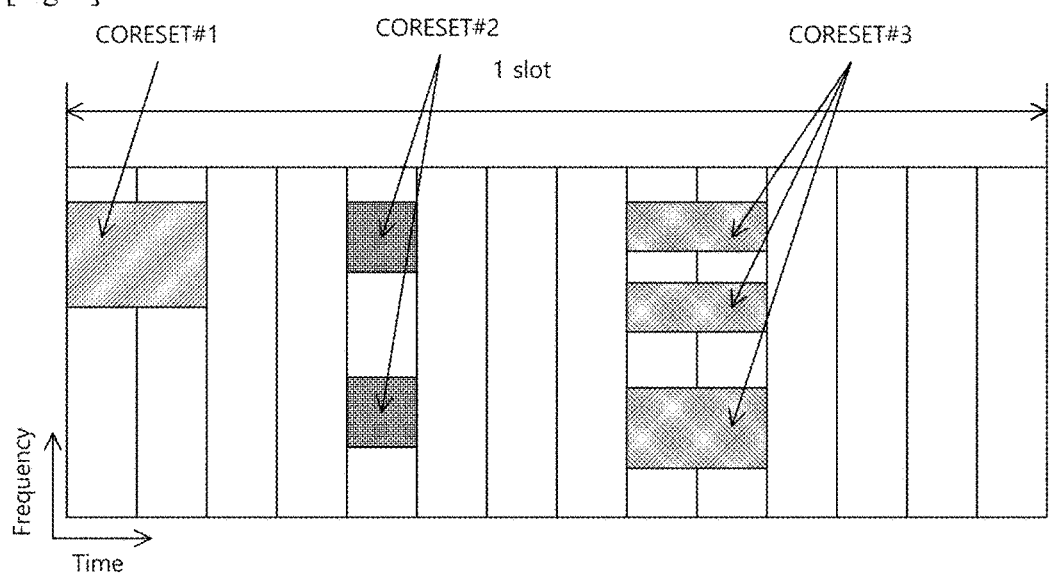

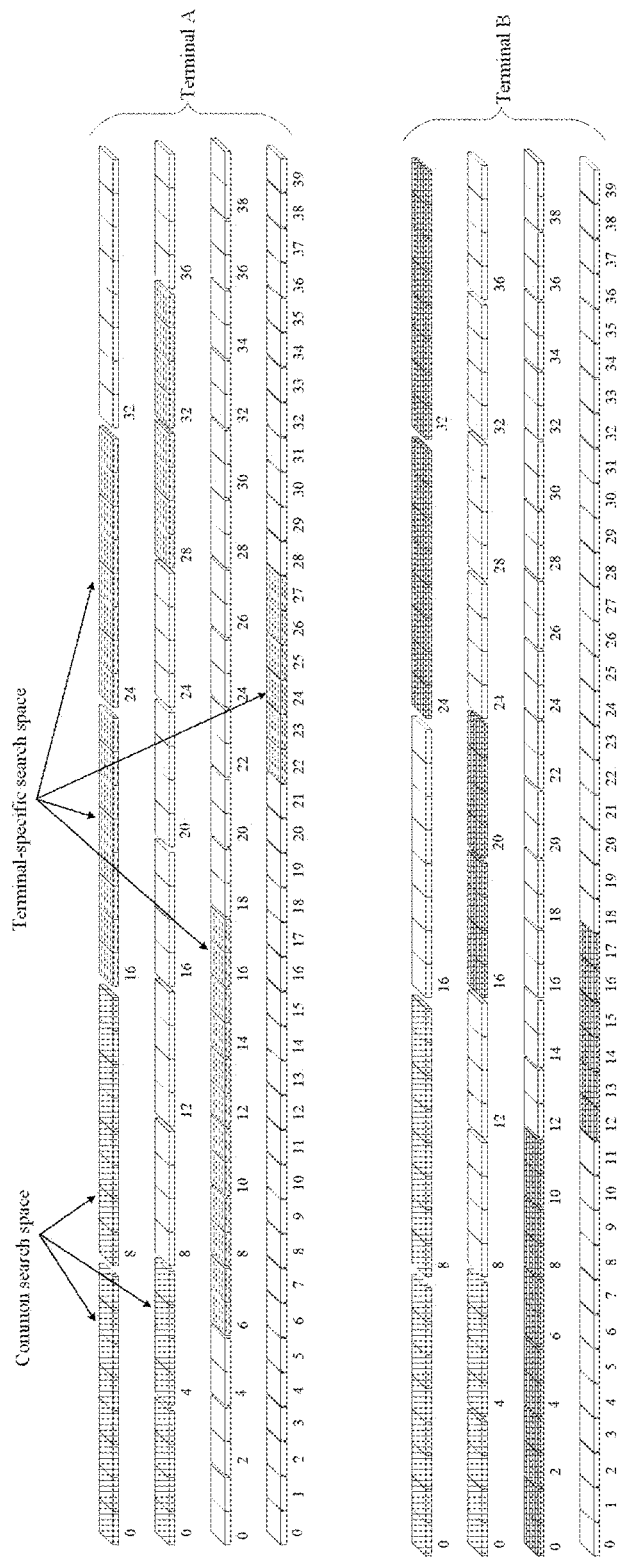
[Fig. 7]

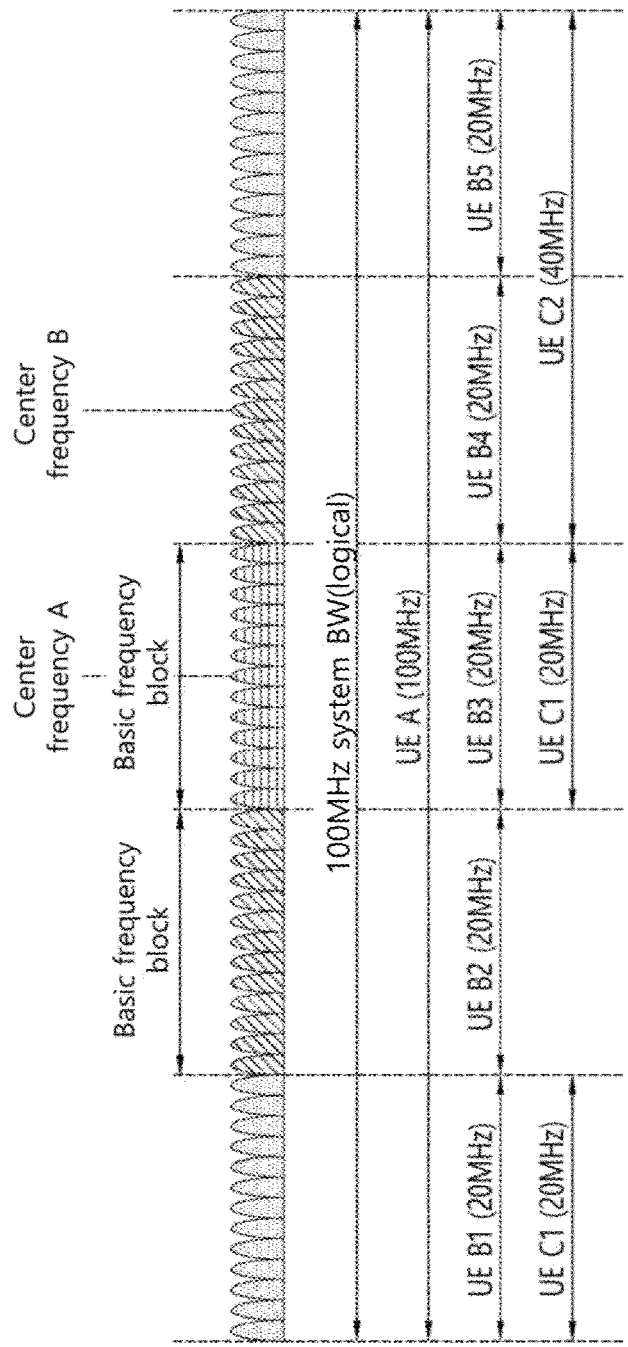
[Fig. 8]

[Fig. 9]
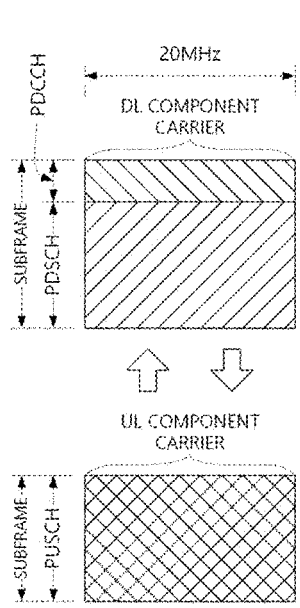
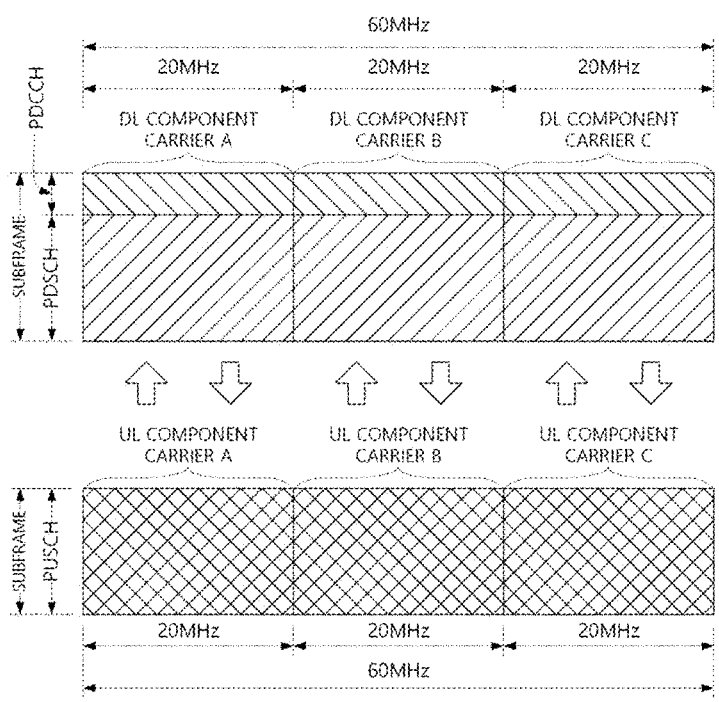
(a) Single CC
(b) Multiple CC

[Fig. 10]
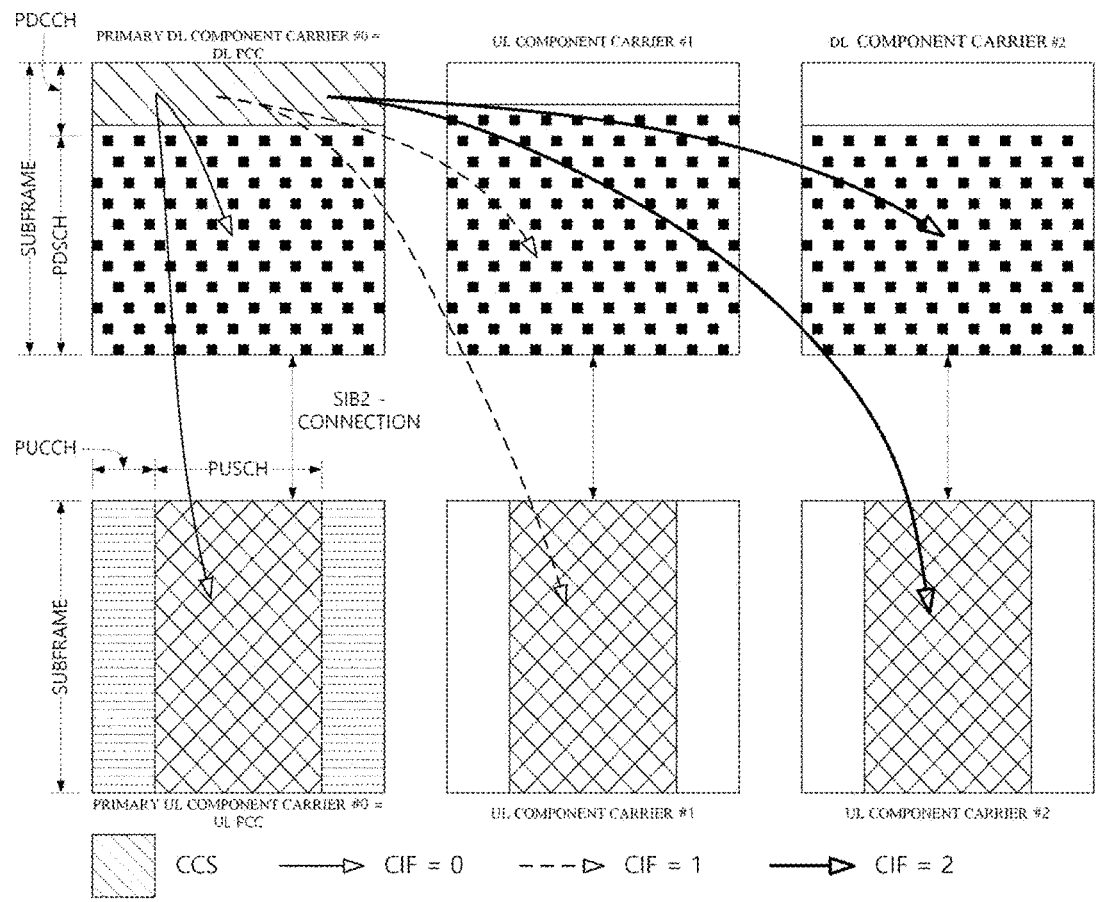

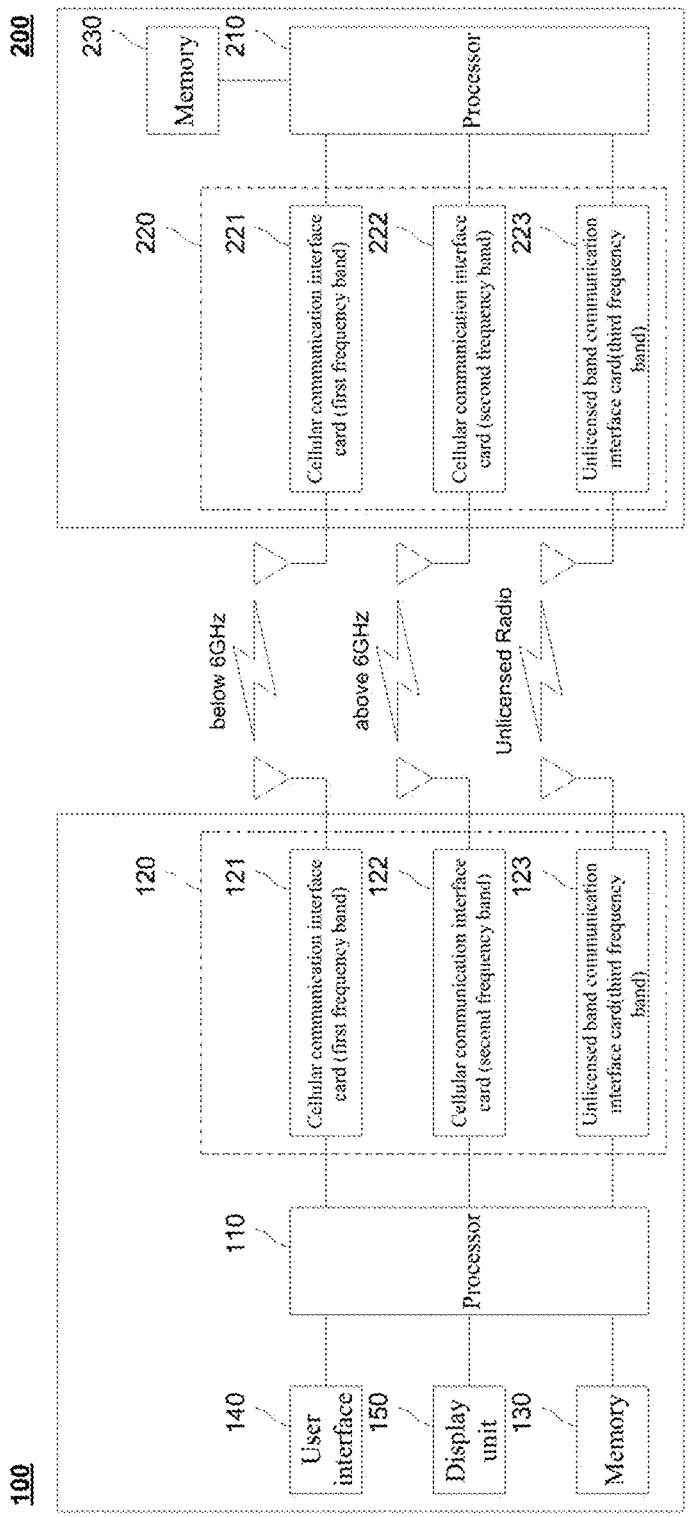
[Fig. 11]

[Fig. 12]
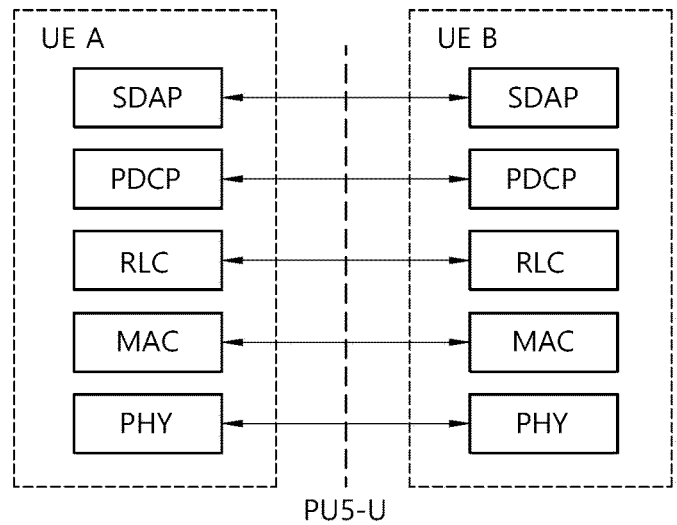
(a)
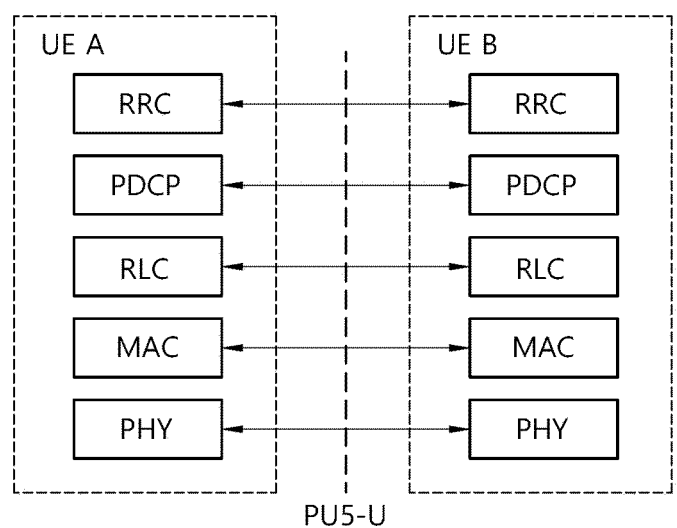

[Fig. 13]
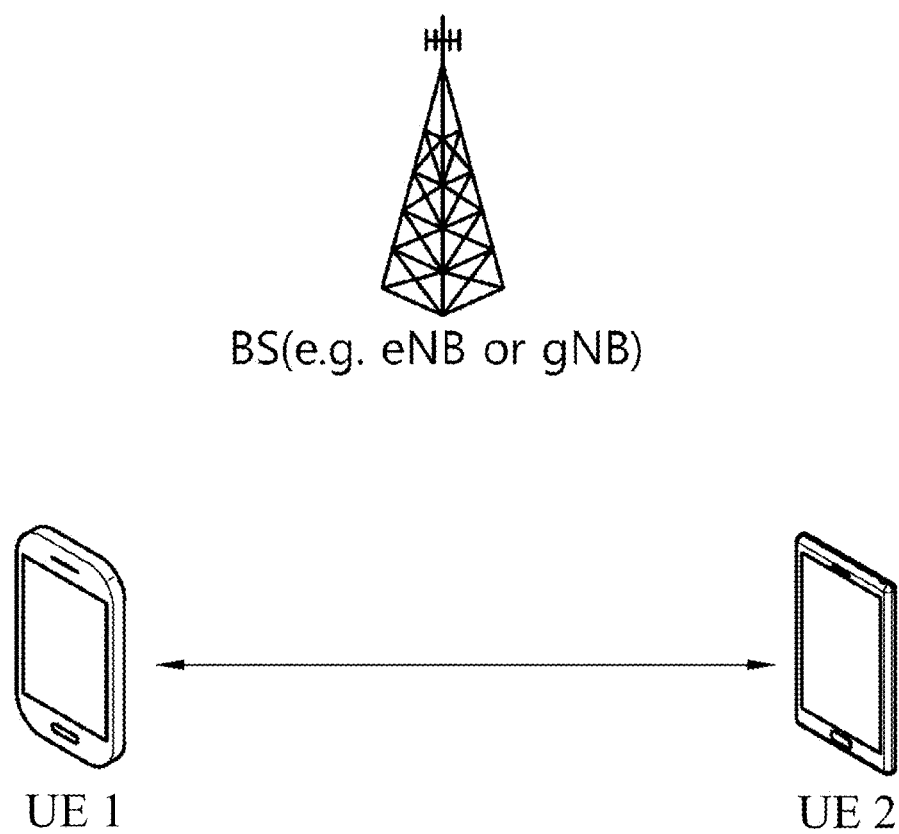

[Fig. 14]
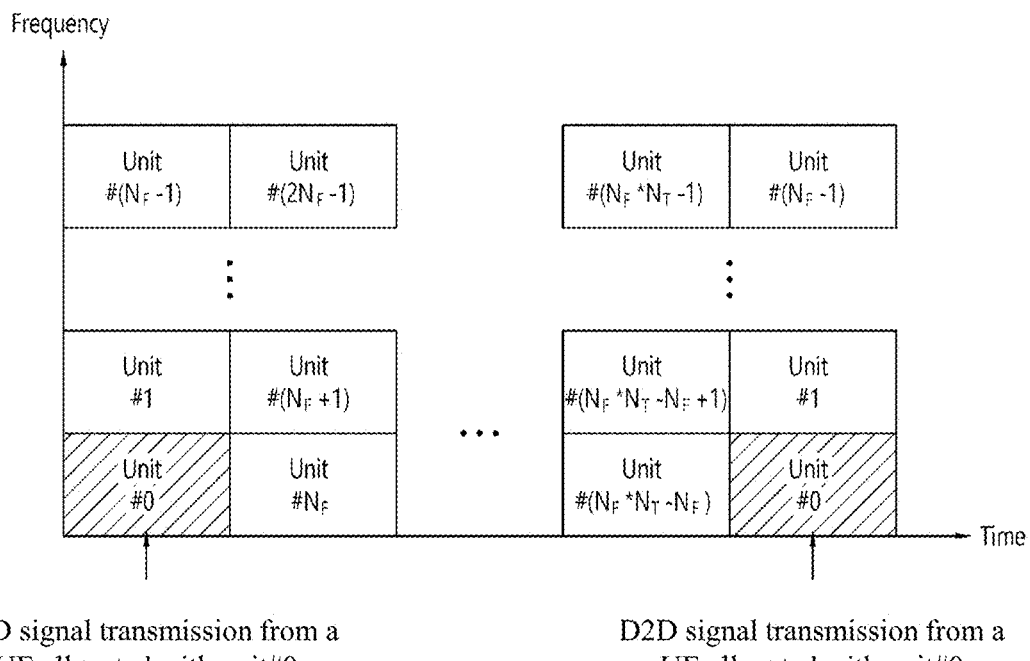

[Fig. 15]
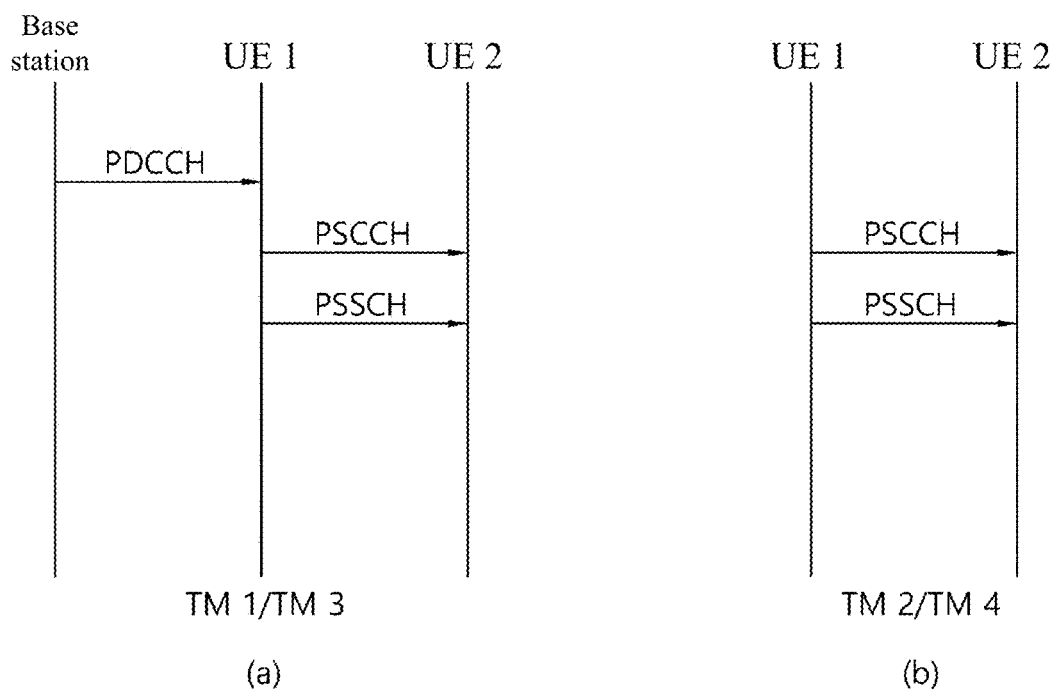

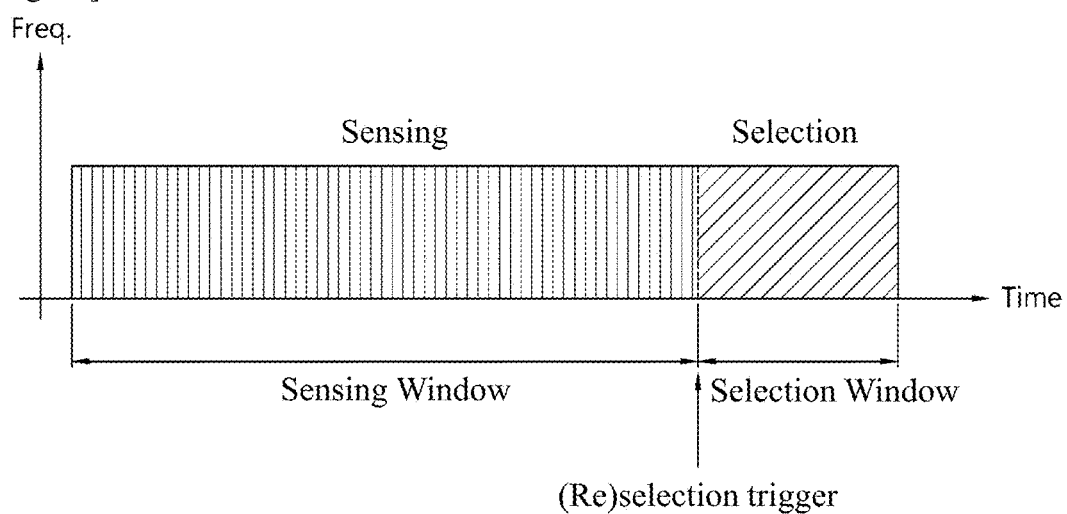
[Fig. 16]

[Fig. 17]
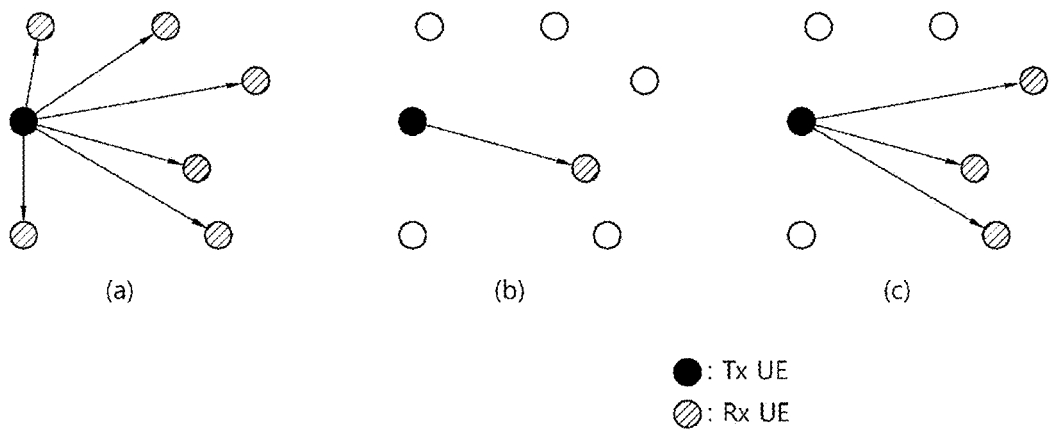

[Fig. 18]
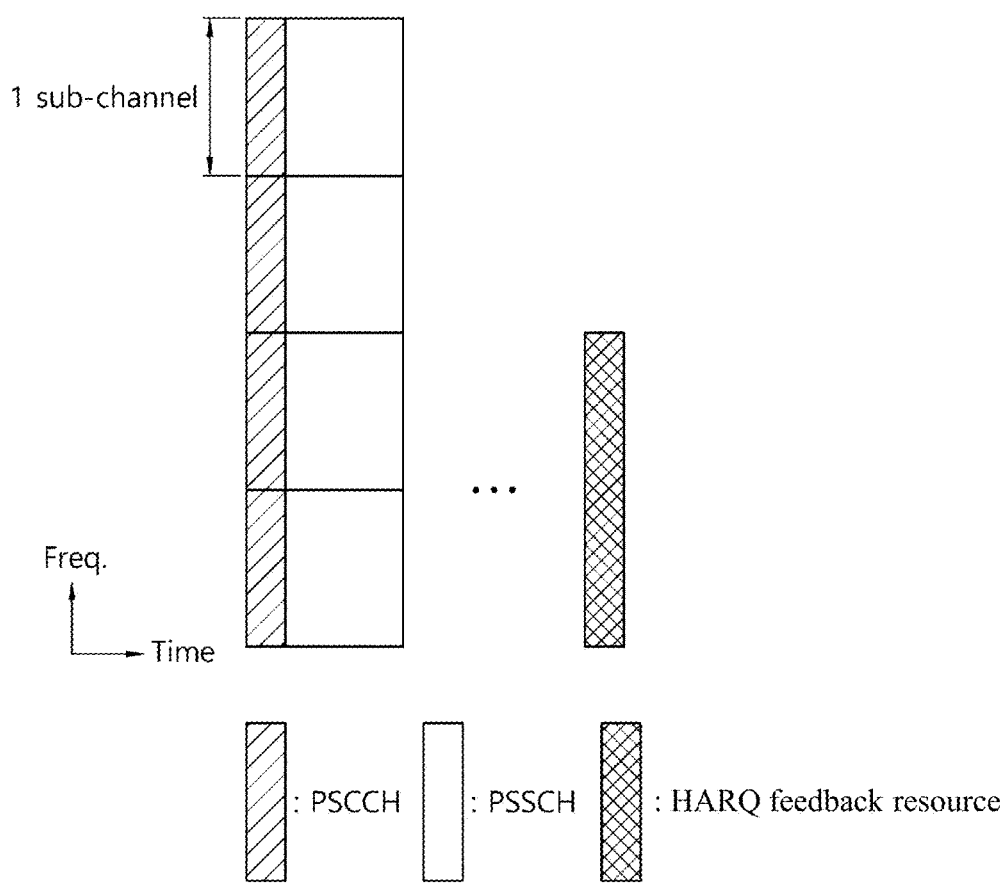

[Fig. 19]
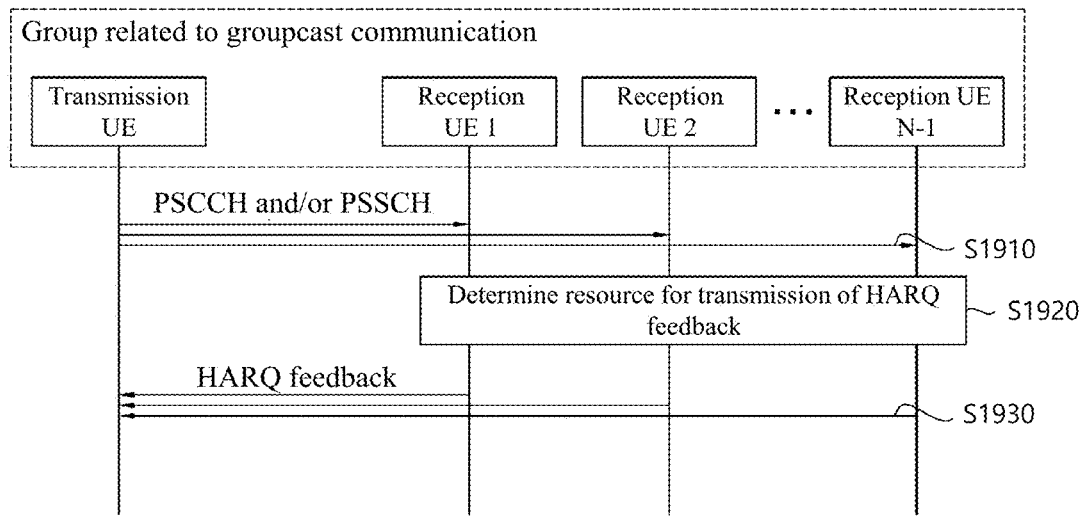

[Fig. 20]
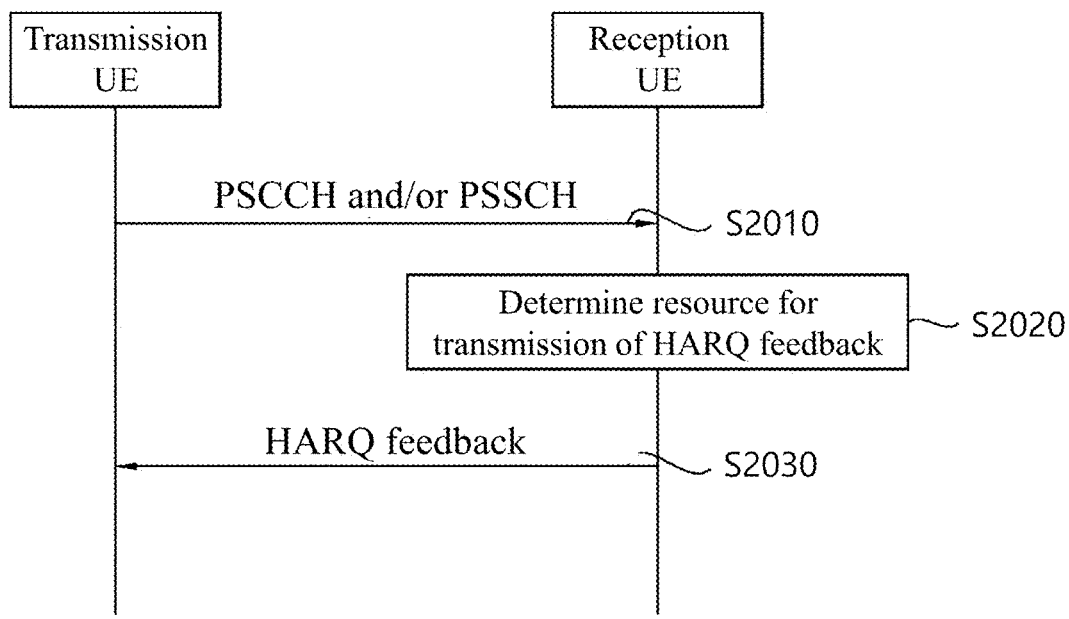

[Fig. 21]
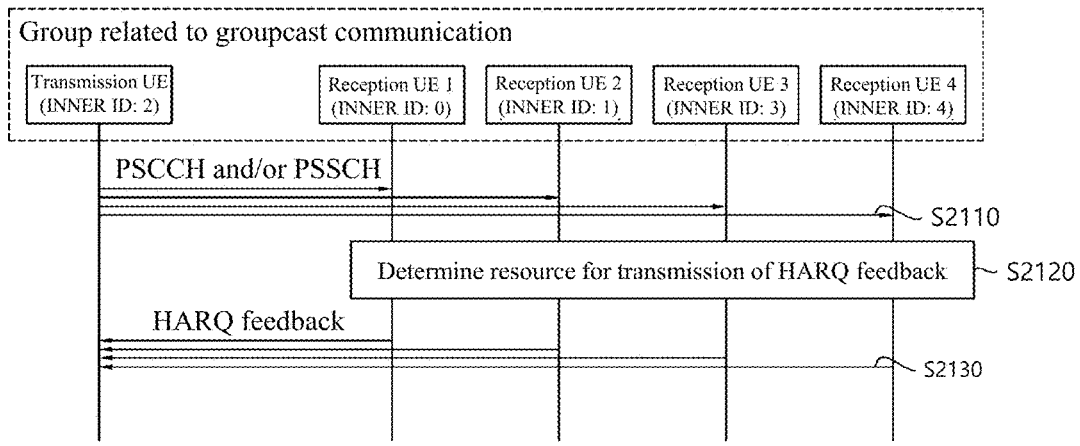

[Fig. 22]
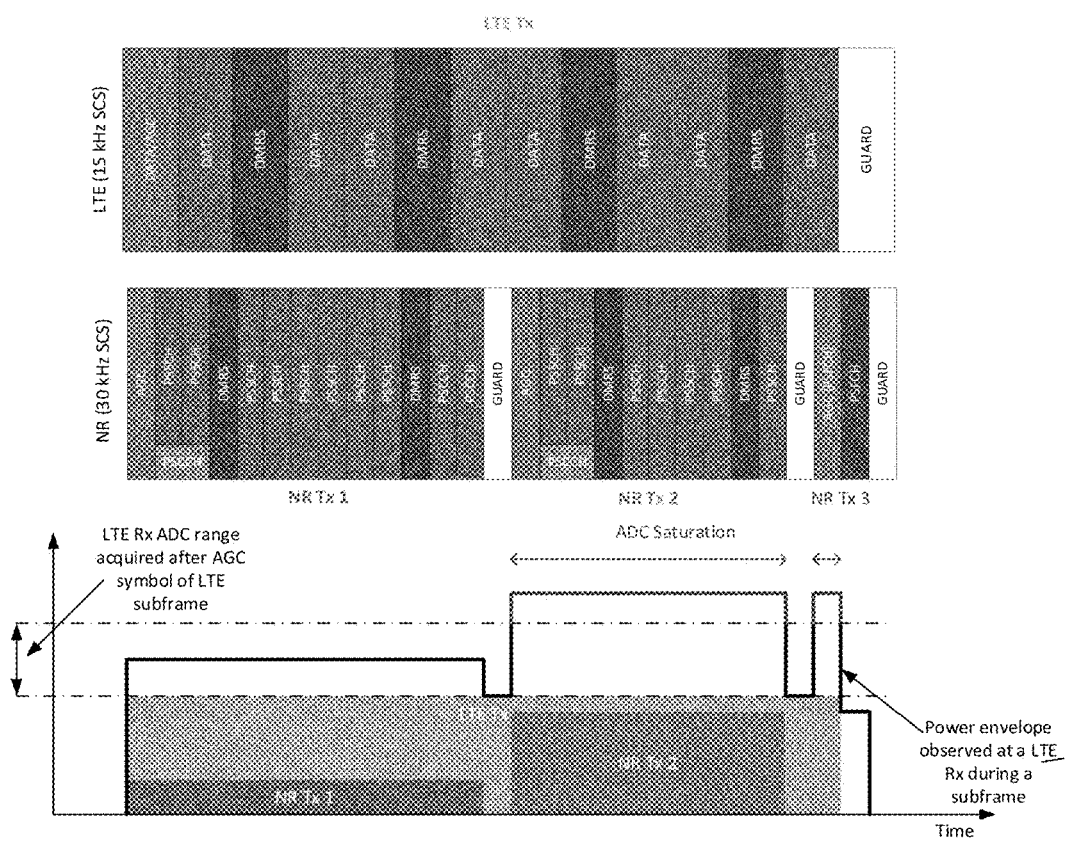

[Fig. 23]
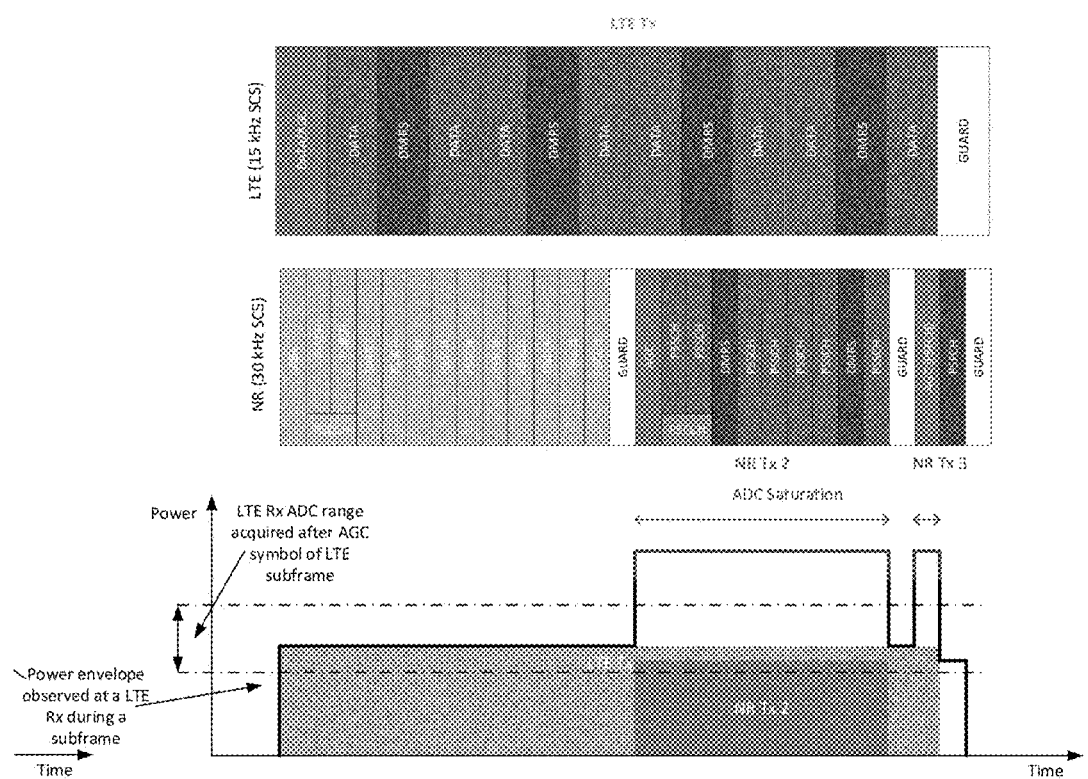

[Fig. 24]
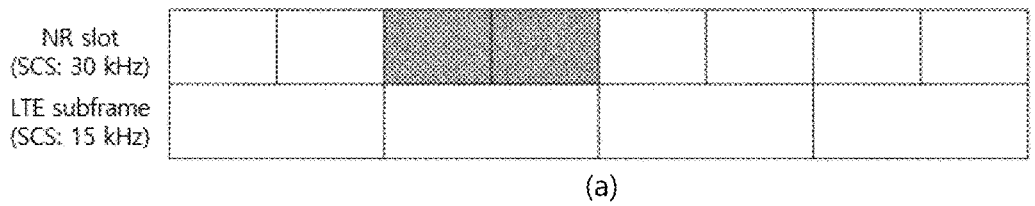
(a)
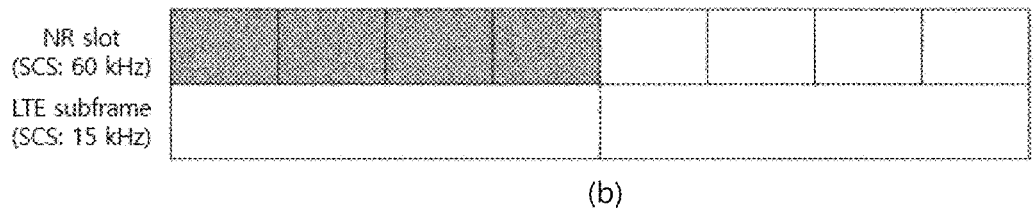
(b)

[Fig. 25]
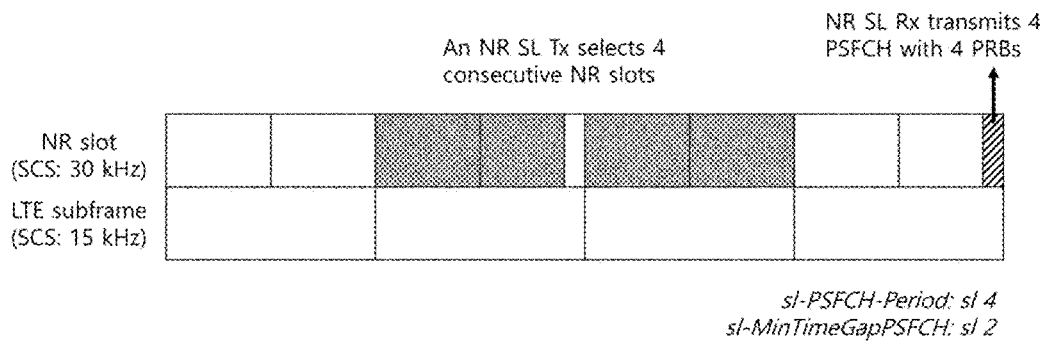

[Fig. 26]
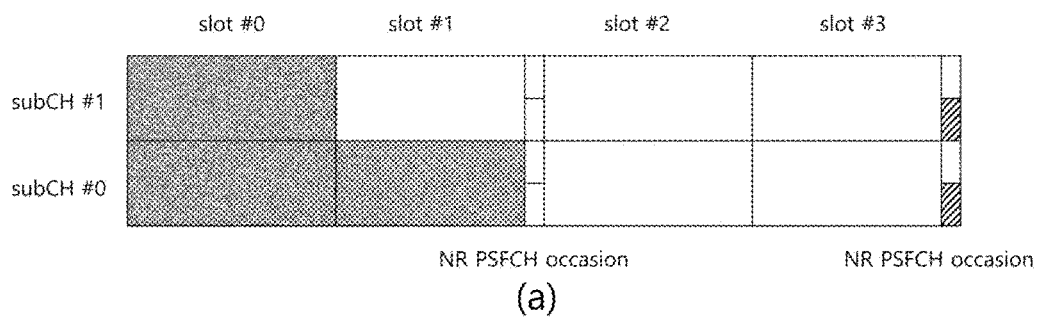
(a)
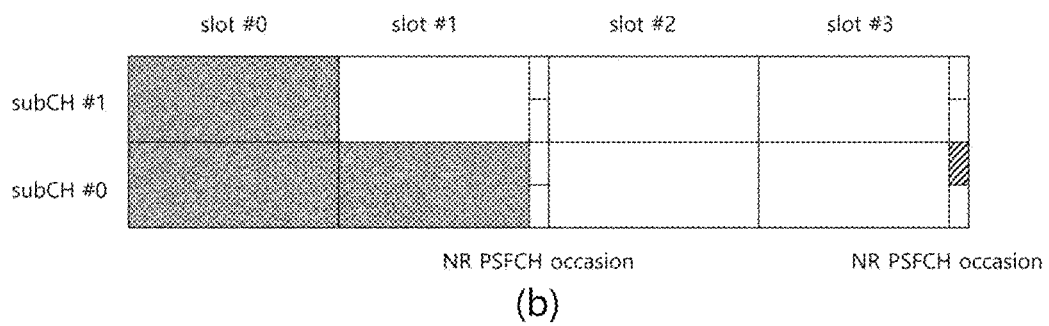
(b)
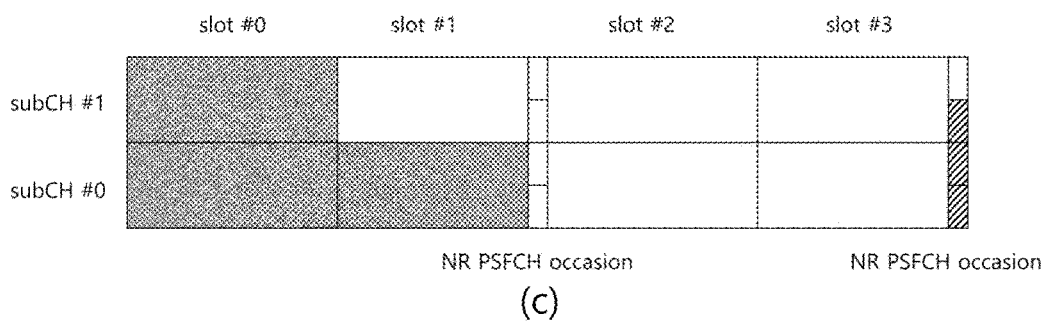
(c)

[Fig. 27]
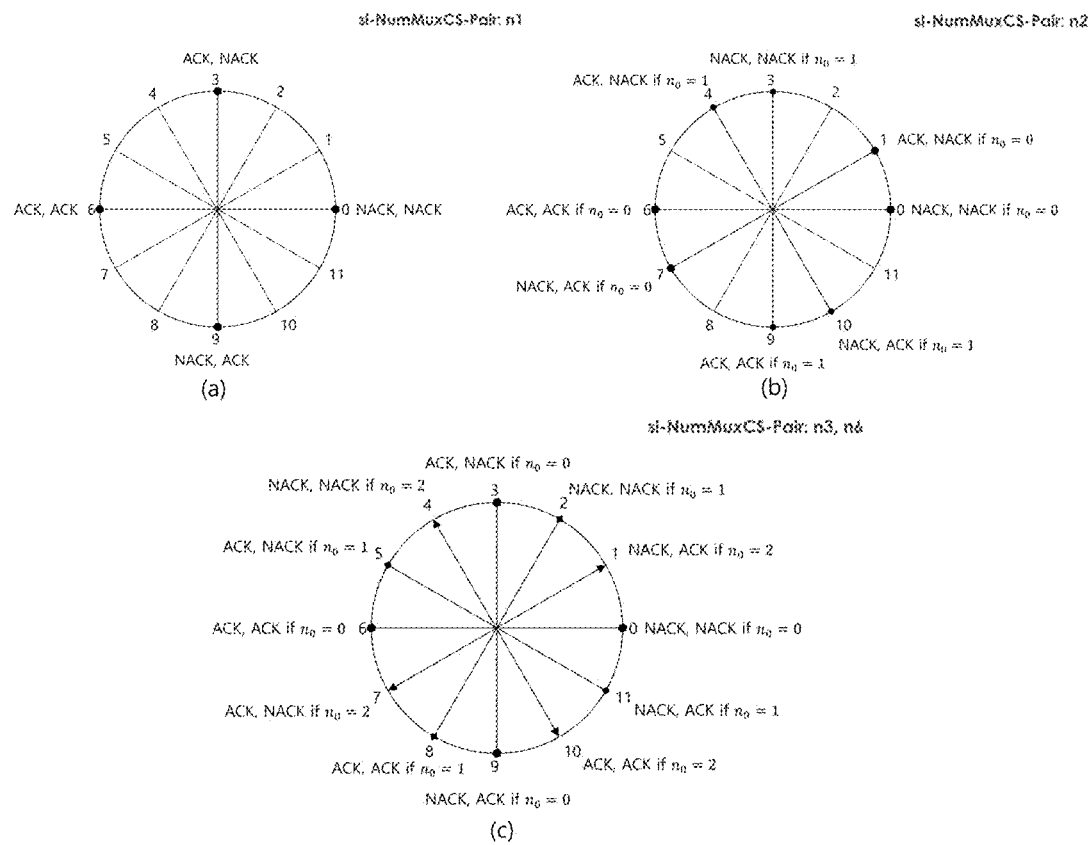

[Fig.28]
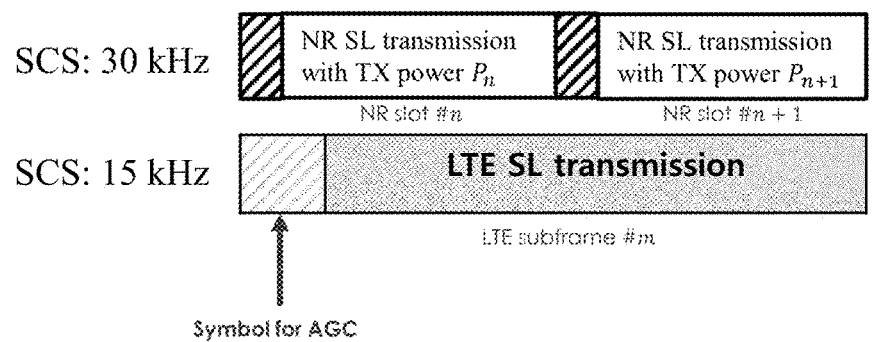

[Fig. 29]
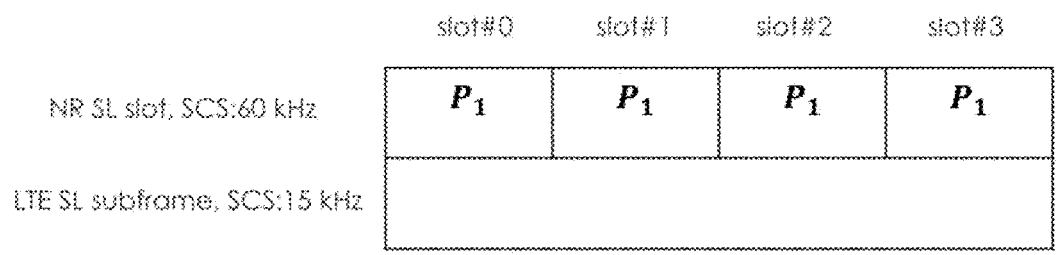

[Fig. 30]

|  | slot#0 | slot#1 | slot#2 | slot#3 |
|---|---|---|---|---|
| NR SL slot, SCS:60 kHz | $P_1$ | $P_2$ | $P_3$ | $P_4$ |
| LTE SL subframe, SCS:15 kHz | | | | |
|  | PSSCH priority: 2 | PSSCH priority: 1 | PSSCH priority: 1 | PSSCH priority: 3 |

(a)

|  | slot#0 | slot#1 | slot#2 | slot#3 |
|---|---|---|---|---|
| NR SL slot, SCS:60 kHz | $\max(P_2, P_3)$ | $\max(P_2, P_3)$ | $\max(P_2, P_3)$ | $\max(P_2, P_3)$ |
| LTE SL subframe, SCS:15 kHz | | | | |
|  | PSSCH priority: 2 | PSSCH priority: 1 | PSSCH priority: 1 | PSSCH priority: 3 |

(b)

[Fig. 31]
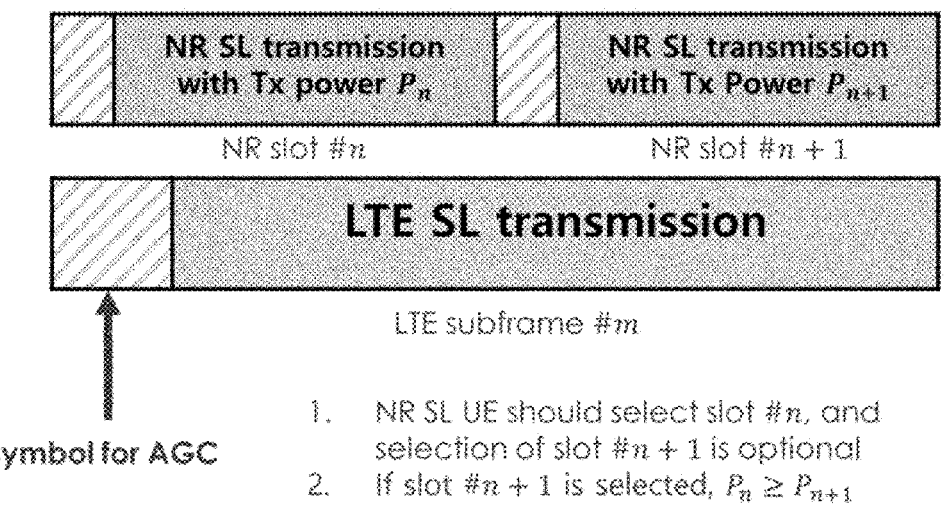

[Fig. 32]
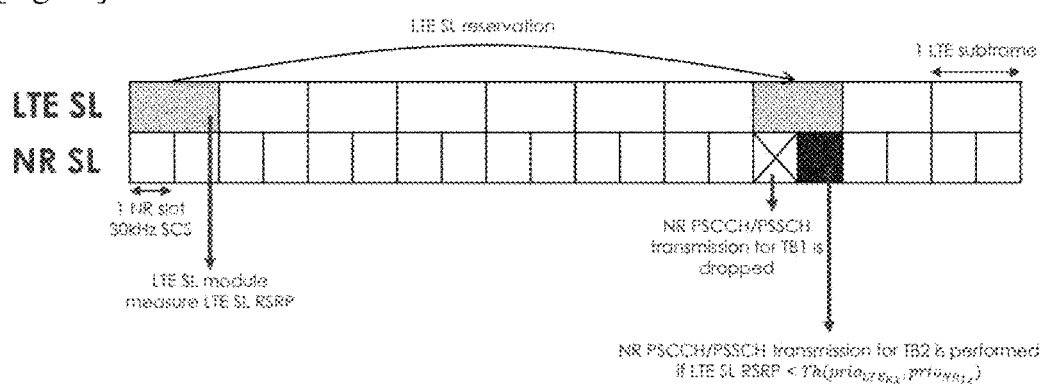

[Fig. 33]
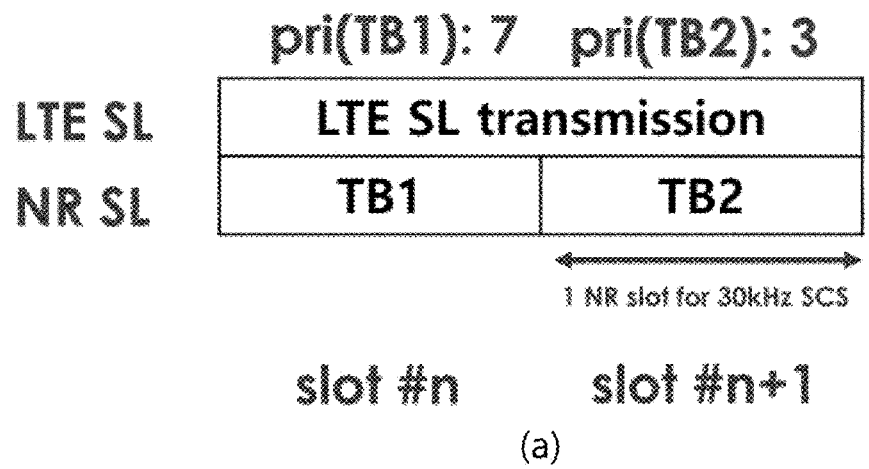
(a)
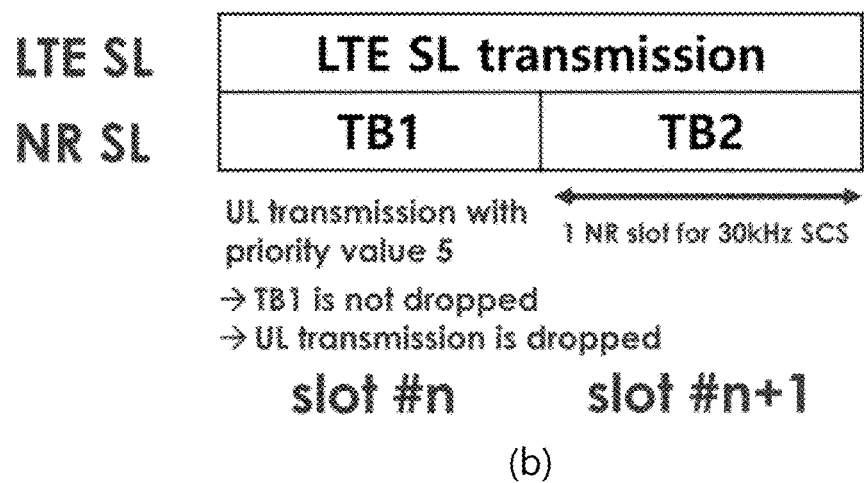
(b)

[Fig. 34]
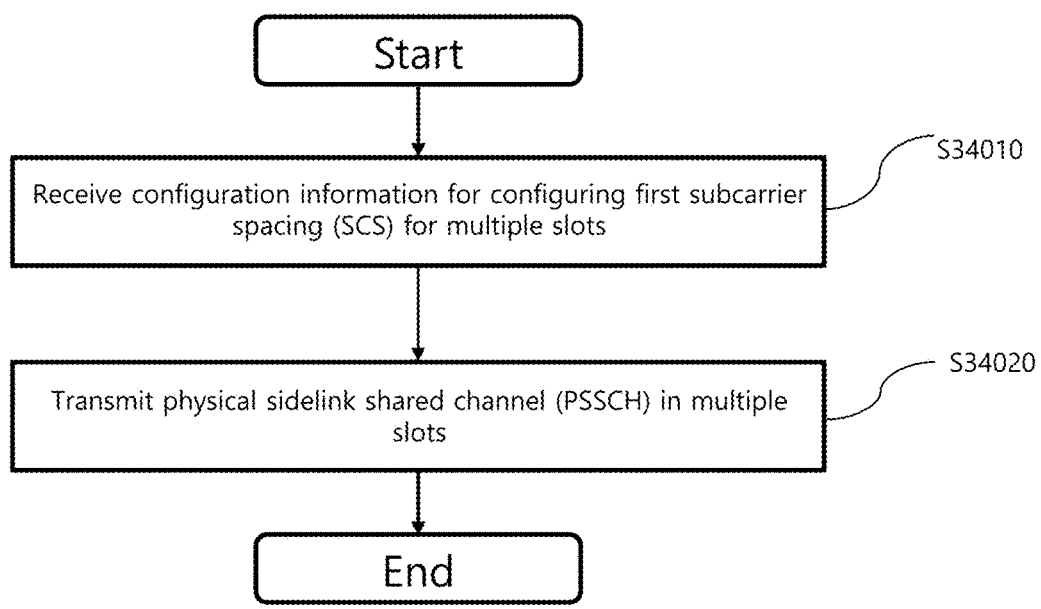

DATA TRANSMISSION/RECEPTION METHOD, DEVICE, AND SYSTEM IN WIRELESS COMMUNICATION SYSTEM

TECHNICAL FIELD

The present disclosure relates to a wireless communication system. Specifically, the present disclosure relates to a radio resource allocation method, a transmission method, a device, and a system for a UE performing NR sidelink communication when UEs operating NR sidelink and LTE sidelink communication co-exist in a co-channel in a wireless communication system.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

A sidelink (SL) refers to a communication method in which a direct link is established between user equipments (UEs), and voice or data is directly exchanged between UEs without going through a base station (BS). The SL is being considered as a method for solving the burden of the base station due to the rapidly increasing data traffic.

Vehicle-to-everything (V2X) refers to a communication technology of exchanging information with other vehicles, pedestrians, infrastructure-built objects, etc. through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities, there is a need for enhanced mobile broadband communication compared to the legacy radio access technology (RAT). Accordingly, communication systems considering services or UEs sensitive to reliability and latency are under discussion, and a next-generation radio access technology in consideration of enhanced mobile broadband communication, massive machine type communication (MTC), and ultra-reliable and low latency communication (URLLC) may be referred to as new radio access technology (RAT) or new radio (NR). Even in NR, vehicle-to-everything (V2X) communication can be supported.

V2X refers to a communication technology of exchanging information with other vehicles, pedestrians, infrastructure, networks, etc. According to the type of a UE with which a vehicle performs communication, V2X may be classified into vehicle-to-vehicle (V2V), vehicle-to-pedestrian (V2P), vehicle-to-infrastructure (V2I), and vehicle-to-network (V2N). V2X communication may be provided through a PC5 interface using SL in an in-coverage situation or an out-of-coverage situation and/or a Uu interface using DL/UL.

For example, for SL communication related to services having requirements with high reliability or services having requirements with relatively high reliability, an SL HARQ feedback operation and/or mechanism of a UE may be useful.

DISCLOSURE OF INVENTION

Technical Problem

An aspect of the present disclosure is to provide a method for efficiently transmitting signals in a wireless communication system and a device using the same. Specifically, an aspect of the present disclosure is to provide a channel transmission method for efficiently performing transmission in a wireless communication system and a device using the same.

Furthermore, an aspect of the present disclosure is to provide a channel configuration method, a transmission method, a device, and a system for terminal(s) for performing NR sidelink communication when the terminal(s), which perform NR sidelink and LTE sidelink communications in a wireless communication system, coexist on a co-channel.

Solution to Problem

A terminal for transmitting a physical uplink shared channel (PUSCH) to a base station in a wireless communication system includes a communication module; and a processor configured to control the communication module, wherein the processor is configured to receive configuration information for configuring a first subcarrier spacing (SCS) for multiple slots; and transmit physical sidelink shared channel (PSSCH) transmissions in the multiple slots, and wherein in case that the terminal coexists with a legacy terminal on a co-channel and the PSSCH transmissions in multiple slots overlap with a legacy subframe of the legacy terminal in a time domain, a second transmission power in at least one slot, other than a first slot, among the multiple slots for the PSSCH transmissions is configured to have a value that is not greater than a first transmission power in the first slot among the multiple slots for the PSSCH transmissions.

In addition, in the present disclosure, a wireless communication method performed by a terminal in a wireless communication system may include: receiving configuration information for configuring a first subcarrier spacing (SCS) for multiple slots; and transmitting physical sidelink shared channel (PSSCH) transmissions in the multiple slots, wherein in case that the terminal coexists with a legacy terminal on a co-channel and the PSSCH transmissions in multiple slots overlap with a legacy subframe of the legacy terminal in a time domain, a second transmission power in at least one slot, other than a first slot, among the multiple slots for the PSSCH transmissions is configured to have a value that is not greater than a first transmission power in the first slot among the multiple slots for the PSSCH transmissions.

In addition, in the present disclosure, the first subcarrier spacing is larger than a second subcarrier spacing configured in the legacy subframe.

In addition, in the present disclosure, the first subcarrier spacing is 30 kHz, and the second subcarrier spacing is 15 kHz.

In addition, in the present disclosure, the terminal supports a NR (new radio) sidelink communication system, and the legacy terminal supports a LTE (long term evolution) sidelink communication system.

In addition, in the present disclosure, the multiple slots comprise two slots.

In addition, in the present disclosure, a first symbol of the multiple slots comprise a symbol for automatic gain control.

In addition, in the present disclosure, whether to drop the transmission of the PSSCH in the first slot is determined based on a transport block having the highest priority among transport blocks for the PSSCH transmissions in the multiple slots.

Advantageous Effects of Invention

The present disclosure provides a method for efficiently transmitting signals in a wireless communication system and a device using the same. Furthermore, the present disclosure provides a channel transmission method for efficiently performing transmission in a wireless communication system and a device using the same.

Furthermore, according to an embodiment of the present disclosure, when terminal(s), which perform NR sidelink and LTE sidelink communication, coexist on a co-channel, the terminal which performs NR sidelink communication, may be configured to maximally ensure stable communication for control and shared channels and a feedback channel, and may transmit the control and shared channels and the feedback channel.

Furthermore, according to an embodiment of the present disclosure, when terminal(s), which perform NR sidelink and LTE sidelink communication, co-exist on a co-channel, and when the subcarrier spacing (SCS) of an NR sidelink is different from the subcarrier spacing of an LTE sidelink, the transmission power of the first NR slot among multiple NR slots overlapping one LTE subframe may limit the transmission power of the remaining NR slots, thereby reducing interference from an LTE terminal.

The effects that can be obtained from the present disclosure are not limited to the effects mentioned above, and other effects not mentioned will be clearly understood by those skilled in the art to which the present disclosure belongs from the following description.

BRIEF DESCRIPTION OF DRAWINGS

FIG. 1 illustrates an example of a wireless frame structure used in a wireless communication system.

FIG. 2 illustrates an example of a downlink (DL)/uplink (UL) slot structure in a wireless communication system.

FIG. 3 is a diagram for explaining a physical channel used in a 3GPP system and a typical signal transmission method using the physical channel.

FIG. 4 illustrates an SS/PBCH block for initial cell access in a 3GPP NR system.

FIG. 5 illustrates a procedure for transmitting control information and a control channel in a 3GPP NR system.

FIG. 6 illustrates a control resource set (CORESET) in which a physical downlink control channel (PUCCH) may be transmitted in a 3GPP NR system.

FIG. 7 illustrates a method for configuring a PDCCH search space in a 3GPP NR system.

FIG. 8 is a conceptual diagram illustrating carrier aggregation.

FIG. 9 is a diagram for explaining single carrier communication and multiple carrier communication.

FIG. 10 is a diagram showing an example in which a cross carrier scheduling technique is applied.

FIG. 11 is a block diagram showing the configurations of a UE and a base station according to an embodiment of the present disclosure.

FIG. 12 illustrates radio protocol architecture for SL communication.

FIG. 13 illustrates an example of a UE and a base station for performing V2X or SL communication.

FIG. 14 illustrates an example of a resource unit for V2X or SL communication.

FIG. 15 illustrates an example of a procedure of performing V2X or SL communication of a UE according to a transmission mode.

FIG. 16 illustrates an example of a method of selecting a transmission resource for transmitting a signal by a UE.

FIG. 17 illustrates an example of three cast types of an NR sidelink.

FIG. 18 illustrates an example of a resource for transmitting HARQ feedback in an NR sidelink.

FIG. 19 illustrates an example of a procedure of transmitting or receiving HARQ feedback by a UE in groupcast SL communication.

FIG. 20 illustrates an example of a procedure of transmitting or receiving HARQ feedback for a PSCCH and/or a PSSCH.

FIG. 21 illustrates an example of a procedure of transmitting or receiving HARQ feedback for a PSCCH and/or a PSSCH in groupcast SL communication.

FIGS. 22 and 23 illustrate an example of an automatic gain control (AGC) problem that may occur in an LTE sidelink terminal when the LTE sidelink terminal coexists with an NR sidelink terminal on a co-channel.

FIG. 24 illustrates an example in which when NR sidelink terminal(s) and LTE sidelink terminal(s) coexist on a co-channel according to an embodiment of the present disclosure, the NR sidelink terminal performs multi-slot transmission or slot aggregation.

FIG. 25 illustrates an example in which an NR sidelink terminal transmits four PSFCHs by using four PRBs according to an embodiment of the present disclosure.

FIG. 26 illustrates an example of a method for selecting time-frequency resources of a PRB to be used for PSFCH transmission when performing the PSFCH transmission by multiplexing two types of HARQ feedback according to an embodiment of the present disclosure.

FIG. 27 illustrates examples of cyclic shifts applied to one PRB transmitted when a PSFCH transmission terminal performs PSFCH transmission using the one PRB by multiplexing two types of HARQ feedback according to an embodiment of the present disclosure.

FIG. 28 illustrates an example of a method for adjusting transmission power when an NR sidelink terminal performs multi-slot transmission or slot aggregation according to an embodiment of the present disclosure.

FIG. 29 illustrates another example of a method for adjusting transmission power when an NR sidelink terminal performs multi-slot transmission or slot aggregation according to an embodiment of the present disclosure.

FIG. 30 illustrates examples of slot states before/after transmission power is adjusted when an NR sidelink terminal performs multi-slot transmission or slot aggregation according to an embodiment of the present disclosure.

FIG. 31 illustrates an example of a resource configuration for NR PSCCH/PSSCH transmission when an NR sidelink terminal coexists with LTE sidelink terminal(s) on a co-channel according to an embodiment of the present disclosure.

FIG. 32 illustrates an example of a method for PSCCH/PSSCH transmission by an NR sidelink terminal when the NR sidelink terminal coexists with LTE sidelink terminal(s) on a co-channel according to an embodiment of the present disclosure.

FIG. 33 illustrates another example of a method for PSCCH/PSSCH transmission by an NR sidelink terminal when the NR sidelink terminal coexists with LTE sidelink terminal(s) on a co-channel according to an embodiment of the present disclosure.

FIG. 34 is a flowchart illustrating an example of a method for PSSCH transmission by an NR sidelink terminal according to an embodiment of the present disclosure.

MODE FOR CARRYING OUT THE INVENTION

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max}N_f/100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and u can have a value of μ=0, 1, 2, 3, 4 as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent u (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, 1) in one slot. k may be an index assigned from 0 to $N^{size,\mu}_{grid,x}*N^{RB}_{sc}-1$ in the frequency domain, and 1 may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | U |  |
| 44 | D | D | D | D | D | X | X | X | X | X | X | U |  |  |
| 45 | D | D | D | D | D | X | X | U | U | U | U | U | U |  |
| 46 | D | D | D | D | X | D | D | D | D | D | X | U |  |  |
| 47 | D | D | X | U | U | U | D | D | X | U | U | U | U |  |
| 48 | D | X | U | U | U | U | D | X | U | U | U | U | U |  |
| 49 | D | D | D | X | X | U | D | D | D | X | X | U |  |  |
| 50 | D | D | X | X | U | U | D | D | X | X | U | U | U |  |
| 51 | D | X | X | U | U | U | D | X | X | U | U | U | U |  |
| 52 | D | X | X | X | X | U | D | X | X | X | X | U |  |  |
| 53 | D | D | X | X | X | U | D | D | X | X | X | U |  |  |
| 54 | X | X | X | X | X | X | D | D | D | D | D | D |  |  |
| 55 | D | D | X | X | X | U | U | U | D | D | D | D | D |  |
| 56-255 | Reserved | | | | | | | | | | | | | |

In Table 1, D denotes a DL symbol, U denotes a UL symbol, and X denotes a flexible symbol. As shown in Table 1, up to two DL/UL switching in one slot may be allowed.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity NcellID of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4(a), a synchronization signal (SS) will be described in more detail. The synchronization signal can be classified into PSS and SSS. The PSS may be used to obtain time region synchronization and/or frequency region synchronization, such as OFDM symbol synchronization and slot synchronization. The SSS can be used to obtain frame synchronization and cell group ID. Referring to FIG. 4(a) and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number l relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{DD}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = (n + 43N^{(2)}_{ID}) \mod 127$$

$$0 \le n < 127$$

Here, and is given as $$[x(6)\ x(5)\ x(4)\ x(3)\ x(2)\ x(1)\ x(0)] = [1\ 1\ 1\ 0\ 1\ 1\ 0]$$

Further, the sequence $d_{SSS}(n)$ of the SSS is as follows.

$$d_{SSS}(n) = [1 - 2x_0((n + m_0) \mod 127)][1 - 2x_1((n + m_1) \mod 127)]$$

$$m_0 = 15 \left\lfloor \frac{N^{(1)}_{ID}}{112} \right\rfloor + 5N^{(2)}_{ID}$$

$$m_1 = N^{(1)}_{ID} \mod 112$$

$$0 \le n < 127$$

Here, $$x_0(i + 7) = (x_0(i + 4) + x_0(i)) \mod 2$$

$$x_1(i + 7) = (x_1(i + 1) + x_1(i)) \mod 2$$

and is given as Here, $[x_0(6)x_0(5)x_0(4)x_0(3)x_0(2)x_0(1)x_0(0)] = [0\ 0\ 0\ 0\ 0\ 0\ 1]$ $[x_0(6)x_1(5)x_1(4)x_1(3)x_1(2)x_1(0)x_1(0)] = [0\ 0\ 1\ 0\ 0\ 1]$ A radio frame with a 10 ms length may be divided into two half frames with a 5 ms length. Referring to FIG. 4(b), a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ($\{2, 8\}+14*n$)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is $\{4, 8, 16, 20\}+28*n$. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ($\{2, 8\}+14*n$)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ($\{4, 8, 16, 20\}+28*n$)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ($\{8, 12, 16, 20, 32, 36, 40, 44\}+56*n$)-th symbol. In this case, at a carrier frequency of 6 GHz or more, n=0, 1, 2, 3, 5, 6, 7, 8.

FIG. 5 illustrates a procedure for transmitting control information and a control channel in a 3GPP NR system. Referring to FIG. 5(a), the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency region designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), ... , d ($M_{symbol}$–1). Here, $M_{symbol}$ may be $M_{bit}/2$. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}$>2) with π/2-Binary Phase Shift Keying (BPSK) or QPSK to generate a complex valued symbol d(0) to d ($M_{symb}$–1). Here, when using π/2-BPSK, $M_{symb}$=$M_{bit}$, and when using QPSK, $M_{symb}$=$M_{bit}/2$. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling (N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

FIG. 9 is a drawing for explaining single carrier communication and multiple carrier communication. Particularly, FIG. 9($a$) shows a single carrier subframe structure and FIG. 9($b$) shows a multi-carrier subframe structure.

Referring to FIG. 9($a$), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time region, and perform data transmission or reception through a UL/DL time unit. Referring to FIG. 9($b$), three 20 MHz component carriers (CCs) can be aggregated into each of UL and DL, so that a bandwidth of 60 MHz can be supported. Each CC may be adjacent or non-adjacent to one another in the frequency region. FIG. 9($b$) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

FIG. 11 is a block diagram showing the configurations of a UE and a base station according to an embodiment of the present disclosure.

In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHZ. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

FIG. 12 illustrates radio protocol architecture for SL communication.

Referring to FIG. 12, FIG. 12(a) illustrates a user plane protocol stack of NR, and FIG. 12(b) illustrates a control plane protocol stack of NR. Hereinafter, a sidelink synchronization signal (SLSS) and synchronization information are described.

Specifically, the SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS).

A physical sidelink broadcast channel (PSBCH) may may be a (broadcast) channel through which basic (system) information that needs to be known first by a UE before SL signal transmission and reception. For example, the basic information may be information related to the SLSS, a duplex mode (DM), time division duplex uplink/downlink (TDD UL/DL) configuration, information related to a resource pool, an application type related to the SLSS, a subframe offset, broadcast information, etc.

The S-PSS, the S-SSS, and the PSBCH may be included in a block format (e.g., a SL synchronization signal (SS)/PSBCH block, hereinafter referred to as a sidelink-synchronization signal block (S-SSB)) for supporting periodic transmission. The S-SSB may have the same numerology (i.e., SCS and CP length) as a physical sidelink control channel (PSCCH)/physical sidelink shared channel (PSSCH) within a carrier, and a transmission bandwidth may exist within a (pre-) configured sidelink bandwidth part (SL BWP). In addition, a frequency position of the S-SSB may be (pre-) configured. Therefore, the UE does not need to perform hypothesis detection in the frequency to discover the S-SSB in the carrier.

Each SLSS may have a physical layer sidelink synchronization identity (ID), and the value thereof may be equal to one from 0 to 335. According to one value used among the above-described values, a synchronization source may also be identified. For example, values of 0, 168, and 169 may indicate global navigation satellite systems (GNSS), values from 1 to 167 may indicate base stations, and values from 170 to 335 may indicate being out of coverage. Alternatively, among the physical layer sidelink synchronization ID values, values 0 to 167 may be values being used by a network, and values from 168 to 335 may be values used outside network coverage.

FIG. 13 illustrates an example of a UE and a base station for performing V2X or SL communication.

Referring to FIG. 13, the term "UE" in V2X/SL communication may mainly refer to an equipment of a user. However, when a network equipment such as a base station transmits or receives a signal according to a communication scheme between the network equipment and the UE, the base station may also be considered as a type of UE.

UE 1 may select a resource unit corresponding to a specific resource within a resource pool that means a set of resources, and operate to transmit an SL signal by using the corresponding resource unit. UE 2 corresponding to a reception UE may receive a configuration of a resource pool in which UE 1 can transmit a signal, and may detect a signal of UE 1 within the corresponding resource pool.

Here, when UE 1 is within a connection range of the base station, the base station may notify of a resource pool. On the other hand, when UE 1 is outside the connection range of the base station, another UE may notify of the resource pool or the resource pool may be determined as a predetermined resource.

FIG. 14 illustrates an example of a resource unit for V2X or SL communication.

Referring to FIG. 14, a resource pool may include multiple resource units, and each UE may select one or multiple resource units and use the same for SL signal transmission. A total of frequency resources of the resource pool may be divided into $N_F$ number of resource units, and a total of time resources of the resource pool may be divided into $N_T$ number of resource units. Accordingly, a total of $N_F*N_T$ number of resource units may be defined in the resource pool.

As shown in FIG. 14, one resource unit (e.g., Unit #0) may be periodically and repeatedly indicated. Alternatively, in order to achieve a diversity effect in the time or frequency dimension, an index of a physical resource unit to which a logical resource unit is mapped may be changed to a pre-determined pattern in accordance with time. In such a resource-unit structure, the resource pool may refer to a set of resource units that can be used for a transmission that is performed by the UE which is to transmit the SL signal.

The resource pool may be segmented to multiple types. For example, according to the content of an SL signal transmitted in each resource pool, the resource pool may be divided as below.

(1) Scheduling assignment (SA) may be a signal including information such as a position of a resource that a transmission UE uses to transmit an SL data channel, a modulation and coding scheme (MCS) or a multiple input multiple output (MIMO) transmission scheme needed for the modulation of other data channels, and a timing advance (TA). The SA may also be multiplexed with SL data within the same resource unit and may then be transmitted, and in this case, an SA resource pool may refer to a resource pool in which the SA is multiplexed with the SL data and then transmitted. The SA may also be referred to as a SL control channel.

(2) A physical sidelink shared channel (PSSCH) may be a resource pool that a transmission UE uses to transmit user data. If the SA is multiplexed with SL data within the same resource unit and then transmitted, only a sidelink data channel obtained by excluding SA information may be transmitted in the resource pool for sidelink data channel. In other words, resource elements (REs) used to transmit SA information on an individual resource unit within the SA resource pool may still be used to transmit SL data in the resource pool of the SL data channel.

Hereinafter, resource allocation in the SL is described.

FIG. 15 illustrates an example of a procedure of performing V2X or SL communication of a UE according to a transmission mode.

Referring to FIG. 15, FIG. 15(a) illustrates a UE operation related to transmission mode 1 or transmission mode 3, and FIG. 15(b) illustrates a UE operation related to transmission mode 2 or transmission mode 4.

Referring to FIG. 15(a), in transmission mode 1 or 3, the base station performs resource scheduling for UE 1 via a PDCCH (more specifically, downlink control information (DCI)), and UE 1 performs SL/V2X communication with UE 2 according to the corresponding resource scheduling.

After transmitting sidelink control information (SCI) to UE 2 via a physical sidelink control channel (PSCCH), UE 1 may transmit data based on the SCI via a physical sidelink shared channel (PSSCH). In case of an LTE SL, transmission mode 1 may be applied to general sidelink communication, and transmission mode 3 may be applied to V2X sidelink communication.

Referring to FIG. 15(b), in transmission mode 2 or 4, the UE may schedule resources on its own. More specifically, in a case of an LTE SL, transmission mode 2 may be applied to general sidelink communication, and the UE may select a resource from a configured resource pool on its own and may then perform an SL operation. Transmission mode 4 may be applied to V2X sidelink communication, and the UE may carry out a sensing/SA decoding process, etc., select a resource within a selection window on its own, and then then perform a V2X sidelink operation. After transmitting the SCI to UE 2 via a PSCCH, UE 1 may transmit SCI-based data via a PSSCH. Hereinafter, the transmission mode may be abbreviated to a "mode". Procedures related to sensing and resource (re) selection may be supported in resource allocation mode 2. The sensing procedure may be defined as decoding the SCI from another UE and/or SL measurement. The decoding of the SCI in the sensing procedure may at least provide information on an SL resource indicated by a UE transmitting the SCI. When the corresponding SCI is decoded, the sensing procedure may use L1 SL reference signal received power (RSRP) measurement, which is based on an SL demodulation reference signal (DMRS). The resource (re) selection procedure may use a result of the sensing procedure in order to determine the resource for the SL transmission.

FIG. 16 illustrates an example of a method of selecting a transmission resource for transmitting a signal by a UE.

Referring to FIG. 16, the UE may identify transmission resources reserved by another UE or resources used by another UE via sensing within a sensing window, and after excluding the identified resources from a selection window, the UE may randomly select a resource from resources having low interference among the remaining resources.

For example, within the sensing window, the UE may decode the PSCCH including information on the cycles of the reserved resources, and then measure PSSCH RSRP from resources that are periodically determined based on the PSCCH. The UE may exclude resources having the PSSCH RSRP value exceeding a threshold value from the selection window. Thereafter, the UE may randomly select an SL resource from the remaining resources within the selection window.

FIG. 17 illustrates an example of three cast types of an NR sidelink.

Referring to FIG. 17, an NR sidelink supports three cast types corresponding to unicast, groupcast, and broadcast. In a case of unicast-type SL communication, the UE may perform one-to-one communication with another UE. In a case of groupcast-type SL communication, the UE may perform SL communication with one or more UEs in a group to which the UE belongs. The groupcast-type SL communication may be substituted by SL multicast communication, SL one-to-many communication, etc.

Hereinafter, a hybrid automatic repeat request (HARQ) procedure in SL is described.

In the case of the SL unicast and groupcast, HARQ feedback and HARQ combining in a physical layer may be supported. For example, when a reception UE operates in resource allocation mode 1 or 2, the reception UE may receive a PSSCH from a transmission UE, and the reception UE may transmit HARQ feedback for the PSSCH to the transmission UE through a physical sidelink feedback channel (PSFCH) by using a sidelink feedback control information (SFCI) format.

For example, the SL HARQ feedback may be enabled for the groupcast. That is, in a non-CBG operation, two HARQ feedback options may be supported for the groupcast.

(1) Groupcast option 1: When a reception UE decodes a PSCCH targeted for the reception UE and then the reception UE fails to decode a transport block related to the PSCCH, the reception UE may transmit HARQ-NACK to the transmission UE through a PSFCH. On the other hand, when the reception UE decodes a PSCCH targeted for the reception UE and the reception UE successfully decodes a transport block related to the PSCCH, the reception UE may not transmit HARQ-ACK to a transmission UE.

(2) Groupcast option 2: When a reception UE decodes a PSCCH targeted for the reception UE and then the reception UE fails to decode a transport block related to the PSCCH, the reception UE may transmit HARQ-NACK to a transmission UE through a PSFCH. In addition, when a reception UE decodes a PSCCH targeted for the reception UE and the reception UE successfully decodes a transport block related to the PSCCH, the reception UE may transmit HARQ-ACK to a transmission UE through a PSFCH.

Meanwhile, for example, in a case of SL communication related to a service having requirements of high reliability or a service having requirements of relatively high reliability, an SL HARQ feedback operation and/or mechanism of the UE may be useful. For example, in a case of SL communication related to a service having requirements of high reliability, an operation in which a UE having received the service transmits SL HARQ feedback to a UE having transmitted the service may be useful in satisfying the requirements of high reliability.

An HARQ feedback resource may include an HARQ feedback transmission resource and/or an HARQ feedback reception resource. For example, the HARQ feedback transmission resource may include a resource for transmitting HARQ feedback and/or a resource related to the transmission of HARQ feedback. For example, the HARQ feedback reception resource may include a resource for receiving HARQ feedback and/or a resource related to the reception of HARQ feedback.

A PSSCH resource may include a PSSCH transmission resource and/or a PSSCH reception resource. For example, the PSSCH transmission resource may include a resource for transmitting a PSSCH and/or a resource related to the transmission of the PSSCH. For example, the PSSCH reception resource may include a resource for receiving a PSSCH and/or a resource related to the reception of the PSSCH.

A PSCCH resource may include a PSCCH transmission resource and/or a PSCCH reception resource. For example, the PSCCH transmission resource may include a resource for transmitting a PSCCH and/or a resource related to the transmission of the PSCCH. For example, the PSCCH reception resource may include a resource for receiving a PSCCH and/or a resource related to the reception of the PSCCH.

The resource may include at least one of a time domain resource, a frequency domain resource, and/or a code domain resource.

When a resource collision occurs during at least one of a PSSCH transmission, a PSCCH transmission, and/or an HARQ feedback transmission of the UE, it may be difficult for the SL HARQ feedback procedure and/or operation of the UE to be correctly executed. For example, when a resource collision occurs during at least one of a PSSCH transmission, a PSCCH transmission, and/or an HARQ feedback transmission, it may be difficult for the overall SL HARQ feedback procedure and/or operation of the UE to be accurately executed.

Although the reception UE has successfully received the PSSCH, when an error occurs in the HARQ feedback (e.g., HARQ ACK) due to the resource collision, the transmission UE may need to unnecessarily retransmit the PSSCH to the reception UE. For example, when the reception UE fails to receive the PSSCH and the HARQ feedback fails to be transmitted to the transmission UE due to the resource collision, the SL communication-related reliability or capability (or performance) may be degraded. For example, when the reception UE fails to receive the PSCCH and/or the PSSCH transmitted from the transmission UE and when an HARQ NACK corresponding to the PSCCH and/or the PSSCH fails to be correctly delivered to the transmission UE due to the resource collision, the SL communication-related reliability or performance may be degraded. Therefore, the HARQ feedback resource may need to be determined so that the collision between the plurality of UEs are prevented or minimized.

A transmission UE may transmit a PSCCH and/or a PSSCH to a reception UE. For example, the transmission UE may transmit SL information to the reception UE by using a PSCCH resource and/or a PSSCH resource. For example, the SL information may include at least one of SL control information, SL data, an SL packet, an SL transport block (TB), an SL message, and/or an SL service.

The reception UE may determine an HARQ feedback resource. Additionally, for example, the transmission UE may determine the HARQ feedback resource.

The HARQ feedback resource may be configured to have a correlation or linkage with the PSSCH. For example, the HARQ feedback resource may include at least one of a time domain resource, a frequency domain resource, and/or a code domain resource. For example, a position of the HARQ feedback resource may be configured to have a correlation or linkage with a linked PSSCH resource. For example, a position of the HARQ feedback resource may be configured to have a correlation or linkage with a linked PSSCH resource, based on a pre-defined function. For example, the HARQ feedback resource may be determined based on at least one of information on a time domain related to the PSSCH, information on a frequency domain related to the PSSCH, and/or information on a code domain related to the PSSCH.

For example, the HARQ feedback resource may be configured to have a correlation or linkage with the PSCCH. For example, a position of the HARQ feedback resource may be configured to have a correlation or linkage with a linked PSCCH resource. For example, a position of the HARQ feedback resource may be configured to have a correlation or linkage with a position of a linked PSCCH resource, based on a pre-defined function. For example, the HARQ feedback resource may be determined based on at least one of information on a time domain related to the PSCCH, information on a frequency domain related to the PSCCH, and/or information on a code domain related to the PSCCH.

The HARQ feedback resource may be configured in the form of a subset of a frequency resource used for PSSCH transmission and/or PSCCH transmission. For example, the frequency domain of the HARQ feedback resource may be configured in the form of a subset of a frequency domain of a linked PSSCH resource and/or PSCCH resource. For example, the frequency domain of the HARQ feedback resource may be included in the frequency domain of a PSSCH resource and/or a PSCCH resource.

FIG. 18 illustrates an example of a resource for transmitting HARQ feedback in an NR sidelink.

Referring to FIG. 18, a transmission UE may transmit a PSCCH and/or a PSSCH to a reception UE via four sub-channels. In this case, the frequency domain of an HARQ feedback resource related to the PSCCH and/or PSSCH may correspond to a subset of the frequency resource used by the transmission UE to transmit a PSCCH and/or a PSSCH.

A time gap between an HARQ feedback resource and a PSSCH resource may be configured. For example, a time gap between an HARQ feedback resource and a PSCCH resource may be configured. For example, in consideration of the decoding capability and/or latency requirements (e.g., V2X message and/or service related latency requirements) of the UE, a time gap may be configured between a PSCCH and/or PSSCH reception point of a reception UE and an HARQ feedback transmission point of the reception UE. For example, in consideration of the decoding capability and/or latency requirements of the UE, a time gap may be configured between an HARQ feedback reception point of a transmission UE and a PSSCH and/or PSCCH (re) transmission point of the transmission UE.

The time gap may be commonly configured in a resource pool. For example, the time gap may be commonly configured between different UEs within a resource pool. For example, the time gap may be commonly configured to the transmission UE and the reception UE. Therefore, the UE may simply determine the HARQ feedback. For example, the time gap may be configured specifically for a resource pool.

Among a latency budget of services co-existing in a resource pool, the time gap may be configured or designated to have a value less than and/or equal to the smallest latency budget value. For example, when service A and service B co-exist in the resource pool and when the latency budget of service A is smaller than the latency budget of service B, the time gap may be configured or designated to have a value that is smaller than or equal to that of the latency budget of service A.

The time gap may be designated so that a maximum number of retransmissions related to a transport block (TB), which is specifically configured according to a resource pool, a service type, a service priority, a cast type, and/or QoS requirements of the service, can all be supported/performed in a latency budget for a (related) service in the resource pool. For example, the maximum number of retransmissions may be a maximum allowable number of retransmissions including an initial transmission.

Among the decoding capabilities of the UE, the time gap may be configured or designated to have a value greater than and/or equal to the greatest decoding capability value. Here, for example, the decoding capability may be a processing time of the UE, which is needed from a PSSCH reception termination/end time of the UE to a PSFCH transmission start time of the UE. For example, the decoding capability may be a processing time of the UE, which is needed from a PSCCH reception termination/end time of the UE to a PSFCH transmission start time of the UE. For example, among the decoding capabilities of the UE within a resource pool, the time gap may be configured or designated to have a value greater than and/or equal to the greatest decoding capability value. For example, when UE A, UE B, and UE C perform SL communication within the resource pool and when the decoding capability of UE A is the least favorable, the time gap may be configured or designated to have a value greater than and/or equal to the processing time that is required from a PSSCH and/or PSCCH reception termination/end time point of UE A to a PSFCH transmission start time point of UE A.

The time gap may be differently or independently configured for each service type, service priority, SL communication type, session related to the service, PPPP related to the service, PPPR related to the service, block error rate (BLER) related to the service, signal to interference plus noise ratio (SINR) related to the service, latency budget related to the service, and/or UE capability. For example, the time gap may be differently or independently configured for each service type, service priority, SL communication type, session related to the service, PPPP related to the service, PPPR related to the service, BLER related to the service, SINR related to the service, latency budget related to the service, and/or UE capability within the resource pool. For example, the SL communication type may include at least one of unicast, groupcast, and/or broadcast.

The reception UE may transmit HARQ feedback to the transmission UE. For example, the reception UE may transmit HARQ feedback corresponding to the PSCCH and/or PSSCH to the transmission UE. For example, the reception UE may transmit the HARQ feedback to the transmission UE by using an HARQ feedback resource, which is determined based on the PSCCH resource and/or the PSSCH resource. For example, the transmission UE may receive HARQ feedback from the reception UE within an HARQ feedback resource, which is determined based on the PSCCH resource and/or the PSSCH resource.

When the reception UE successfully receives the PSCCH and/or the PSSCH, the HARQ feedback may be an HARQ ACK. For example, when the reception UE fails to receive the PSCCH and/or the PSSCH, the HARQ feedback may correspond to at least one of an HARQ NACK and/or discontinuous detection (DTX).

In a case of groupcast in which multiple UEs within a group perform SL communication with one another, the HARQ feedback resource may be implemented as two different types.

(1) Option A: A common HARQ feedback resource may be configured between reception UEs. For example, when a transmission UE transmits a PSSCH and/or a PSCCH to multiple reception UEs, the HARQ feedback resource may be commonly configured for the multiple reception UEs that have received the PSSCH and/or the PSCCH.

(2) Option B: HARQ feedback resources being different or independent from one another may be configured between reception UEs. For example, HARQ feedback resources being different or independent from one another may be configured for each reception UE or sub-group including one or more reception UEs. For example, when a transmission UE transmits a PSSCH and/or a PSCCH to multiple reception UEs, HARQ feedback resources being different or independent from one another may each be configured for multiple sub-groups or multiple reception UEs that have received the PSSCH and/or the PSCCH.

Option A may be limitedly applied only to groupcast option 1. For example, in groupcast option 1, multiple reception UEs may transmit an HARQ NACK to the transmission UE by using an HARQ feedback resource, which is commonly configured for the multiple reception UEs, only when the multiple reception UEs fail to receive the PSSCH and/or PSCCH. For example, the HARQ NACK may be implemented in the form of a single frequency network (SFN). In this case, the transmission UE may not be capable of separating and receiving the HARQ NACKS transmitted by the multiple reception UEs. Therefore, the transmission UE may not be able to know a reception UE which has transmitted the HARQ NACK. However, the transmission UE may know that at least one reception UE among the multiple reception UEs has transmitted the HARQ NACK, and the transmission UE may retransmit the PSSCH and/or the PSCCH to the multiple reception UEs.

In a case of option A, a unicast-related HARQ feedback resource structure may be re-used. For example, in a case of option A, overhead related to the HARQ feedback resource may be decreased. Conversely, in a case of option A, there may be limitations that the transmission UE cannot determine/recognize a DTX. For example, when the transmission UE has transmitted the PSSCH and/or the PSCCH to the reception UE, the reception UE may fail to receive a PSCCH, which schedules the PSSCH. In this case, according to option A, the reception UE may not transmit the HARQ NACK to the transmission UE. Therefore, there may occur a problem where the transmission UE misinterprets that the reception UE has successfully received the PSSCH.

In a case of option B, within a group including multiple reception UEs, HARQ feedback resources being different or independent from one another may be allocated for each reception UE or sub-group. Here, for example, according to option B, as the number of reception UEs or the number of sub-groups included in the group becomes larger, a larger amount of HARQ feedback resources may be required. For example, in a case of a group including N number of reception UEs, (N−1) number of HARQ feedback resources may be required. For example, option B may be limitedly applied only to groupcast option 2.

FIG. 19 illustrates an example of a procedure of transmitting or receiving HARQ feedback by a UE in groupcast SL communication.

In FIG. 19, it is assumed that N number of UEs are included in a group. For example, the group may correspond to a group related to groupcast SL communication. For example, the embodiment of FIG. 19 may be applied with respect to option B. For example, the embodiment of FIG. 19 may be applied with respect to groupcast option 2.

Referring to FIG. 19, a transmission UE may transmit a PSCCH and/or a PSSCH to multiple reception UEs in a group (S1910). For example, the transmission UE may transmit SL information to the multiple reception UEs in the group by using a PSCCH resource and/or a PSSCH resource. For example, the SL information may include at least one of SL control information, SL data, an SL packet, an SL transport block (TB), an SL message, and/or an SL service The multiple reception UEs having received the PSCCH and/or the PSSCH may determine an HARQ feedback resource (S1920). Additionally, for example, the transmission UE may determine the HARQ feedback resource.

When the group is generated, an identifier (hereinafter, GUE_ID) used within the group may be allocated for each UE. For example, when the group is generated, a GUE_ID may be allocated for each sub-group. For example, the GUE_ID may be generated by a specific UE and may then be delivered to the UEs within the group. For example, the specific UE may be a group owner (GO). For example, the GUE_ID may be configured by the network or base station, or may be configured in advance. For example, the GUE_ID may be differently allocated for the multiple UEs within the group. For example, the GUE_ID may be differently allocated for the multiple sub-groups within the group.

The multiple reception UEs may each determine an HARQ feedback resource, based on its GUE_ID. For example, reception UE 1 may determine the HARQ feedback resource by using the GUE_ID that is allocated to reception UE 1, reception UE 2 may determine the HARQ feedback resource by using the GUE_ID that is allocated to reception UE 2, and reception UE (N−1) may determine the HARQ feedback resource by using the GUE_ID that is allocated to reception UE (N−1). Therefore, the HARQ feedback resource may be differently determined for each of the multiple reception UEs within the group.

UEs (e.g., reception UEs) remaining after excluding the transmission UE may sequentially use the multiple HARQ feedback resources (e.g., (N−1) number of HARQ feedback resources, where N indicates the number of UEs in the group) in accordance with an ascending order of the GUE_ID. For example, UEs (e.g., reception UEs) remaining after excluding the transmission UE may sequentially use the multiple HARQ feedback resources (e.g., (N−1) number of HARQ feedback resources) in accordance with a descending order of the GUE_ID. For example, UEs (e.g., reception UEs) remaining after excluding the transmission UE may sequentially use the multiple HARQ feedback resources (e.g., (N−1) number of HARQ feedback resources) in accordance with an order of the GUE_ID that is derived based on a pre-configured function/rule. For example, the multiple HARQ feedback resources may be configured in advance. For example, the transmission UE may correspond to a UE that has transmitted the PSSCH and/or the PSCCH to the multiple reception UEs.

Sub-groups remaining after excluding the transmission UE may sequentially use the multiple HARQ feedback resources in accordance with an ascending order of the GUE_ID. For example, sub-groups remaining after excluding the transmission UE may sequentially use the multiple HARQ feedback resources in accordance with a descending order of the GUE_ID. For example, sub-groups remaining after excluding the transmission UE may sequentially use the multiple HARQ feedback resources in accordance with an order of the GUE_ID that is derived based on a pre-configured function/rule. For example, the multiple HARQ feedback resources may be configured in advance. For example, the transmission UE may correspond to a UE that has transmitted the PSSCH and/or the PSCCH to the multiple reception UEs.

Thereafter, each of the multiple UEs may transmit HARQ feedback to the transmission UE by using the determined HARQ feedback resource (S1930).

FIG. 20 illustrates an example of a procedure of transmitting or receiving HARQ feedback for a PSCCH and/or a PSSCH.

Referring to FIG. 20, multiple reception UEs may each transmit HARQ feedback to a transmission UE. For example, the multiple reception UEs may each transmit HARQ feedback corresponding to the PSCCH and/or the PSSCH to the transmission UE. The multiple reception UEs may each transmit the HARQ feedback to the transmission UE by using an HARQ feedback resource, which is determined based on the PSCCH resource and/or the PSSCH resource.

When the reception UE successfully receives the PSCCH and/or the PSSCH, the HARQ feedback may be an HARQ ACK. For example, when the reception UE fails to receive the PSCCH and/or the PSSCH, the HARQ feedback may be at least one of an HARQ NACK and/or discontinuous detection (DTX).

The UE may determine HARQ feedback transmission power based on at least one of an SL pathloss value derived/acquired based on a reference signal on an SL channel, an SL RSRP value derived/acquired based on a reference signal on the SL channel, an SL RSRQ value derived/acquired based on a reference signal on the SL channel, an open-loop power control parameter, and/or a closed-loop power control parameter. For example, when the transmission UE transmits a reference signal to the reception UE via an SL channel, the reception UE may determine HARQ feedback transmission power based on at least one of an SL pathloss value derived/acquired based on a reference signal on an SL channel, an SL RSRP value derived/acquired based on a reference signal on the SL channel, an SL RSRQ value derived/acquired based on a reference signal on the SL channel, an open-loop power control parameter, and/or a closed-loop power control parameter.

The reference signal on the SL channel may be defined in advance. The reference signal on the SL channel may be a DMRS transmitted on the PSSCH (i.e., PSSCH DMRS) or a DMRS transmitted on the PSCCH (i.e., PSCCH DMRS). The reference signal on the SL channel may be a CSI-RS transmitted on a PSSCH. The reference signal on the SL channel may be a reference signal used for quality estimation (e.g., CQI, PMI, or RI) of the SL channel. For example, the reference signal on the SL channel may be a reference signal used for the measurement of at least one of an SL pathloss value, an SL RSRP value, and/or an SL RSRQ value.

The SL pathloss may be a pathloss corresponding to a link between a transmission UE and a reception UE. For example, the open-loop power control parameter and/or the closed-loop power control parameter may be configured in advance. For example, the open-loop power control parameter may include a Po and/or an alpha value.

Po may be a power control parameter for averagely satisfying a target error rate (e.g., block error rate (BLER) or frame error rate (FER)) related to packet/message transmission. For example, Po may be a power control parameter related to an average reception SINR between a transmission UE and a reception UE. For example, Po may be a power control parameter that is specified to a UE, a resource pool, a service type, a service priority level, QoS requirements related to a service, a (frequency) resource size being used for SL transmission, an MCS value being used for SL transmission, a congestion level (e.g., CBR) related to the resource pool, and/or a cast type. For example, when the HARQ feedback transmission power is calculated/derived based on an SL RSRP and/or SL RSRQ value/range, different Po values/ranges may be mapped/configured for each (pre-configured) SL RSRP and/or SL RSRQ value/range.

When the HARQ feedback transmission power is calculated/derived based on an SL pathloss, an alpha value may be a weighted value applied to (measured) pathloss compensation. When the HARQ feedback transmission power is calculated/derived based on an SL RSRP and/or SL RSRQ value/range, an alpha value may be a weighted value applied to a (measured) SL RSRP and/or SL RSRQ value/range. When the HARQ feedback transmission power is calculated/derived based on an SL RSRP and/or SL RSRQ value/range, an alpha value may be a weighted value applied to HARQ feedback transmission power mapped/configured for each (measured) SL RSRP and/or SL RSRQ value/range. Here, an alpha value/range may be specifically configured for a UE, a resource pool, a service type, a service priority level, QoS requirements related to a service, a (frequency) resource size being used for SL transmission, an MCS value being used for SL transmission, a congestion level (e.g., CBR) related to the resource pool, and/or a cast type. When the HARQ feedback transmission power is calculated/derived based on an SL RSRP and/or SL RSRQ value/range, different alpha values/ranges may be mapped/configured for each (pre-configured) SL RSRP and/or SL RSRQ value/range.

When the HARQ feedback transmission power is calculated/derived based on an SL RSRP and/or SL RSRQ value/range, different offset values/ranges may be mapped/configured for each (pre-configured) SL RSRP and/or SL RSRQ value/range. A UE that has measured the SL RSRP and/or SL RSRQ may apply the offset related to the SL RSRP value and/or SL RSRQ value to (pre-configured normalized or nominal) (maximum) SL (HARQ feedback) transmission power, so as to determine final HARQ feedback transmission power. Here, for example, the offset value/range may be specifically configured for a UE, a resource pool, a service type, a service priority, QoS requirements related to a service, a (frequency) resource size used for SL transmission, an MCS value used for SL transmission, a congestion level (e.g., CBR) related to the resource pool, and/or a cast type.

Different (normalized or nominal) (maximum) SL HARQ feedback transmission power values/ranges may be mapped/configured for each (pre-configured) SL RSRP and/or SL RSRQ value/range. For example, a (normalized or nominal) (maximum) SL HARQ feedback transmission power value/range may be specifically configured for a UE, a resource pool, a service type, a service priority, QOS requirements related to a service, a (frequency) resource size used for SL transmission, an MCS value used for SL transmission, a congestion level (e.g., CBR) related to the resource pool, and/or a cast type.

The reference signal and/or the transmission power value related to an SL channel including the reference signal may be signaled to a UE via a pre-defined channel. The transmission UE may transmit the reference signal and/or the transmission power value related to an SL channel including the reference signal to the reception UE via a pre-defined channel. The pre-defined channel may correspond to a PSCCH. The reception UE may correspond to a UE measuring at least one of an SL pathloss, SL RSRP, and/or an SL RSRQ based on the reference signal.

The open-loop power control parameter (and/or (maximum or minimum) HARQ feedback transmission power value mapped/configured for each SL RSRP (and/or SL RSRQ) value/range) may be differently or independently configured for each service type, service priority, SL communication type (e.g., unicast, groupcast, or broadcast), (resource pool related) congestion level (e.g., Channel Busy Ratio (CBR)), session related to the service, PPPP related to the service, PPPR related to the service, block error rate (BLER) related to the service, target signal to interference plus noise ratio (SINR) related to the service, (minimum or maximum) target communication distance related to the service, and/or latency budget related to the service. For example, a closed-loop transmission power control operation/parameter may be differently or independently operated/configured for each service type, service priority, SL communication type (e.g., unicast, groupcast, or broadcast), (resource pool related) congestion level (e.g., CBR), session related to the service, PPPP related to the service, PPPR related to the service, block error rate (BLER) related to the service, target signal to interference plus noise ratio (SINR) related to the service, (minimum or maximum) target communication distance related to the service, and/or latency budget related to the service.

An open-loop transmission power control parameter related to the HARQ feedback may be differently or independently configured from the open-loop transmission power control parameter related to the PSSCH and/or the PSCCH. A closed-loop transmission power control operation/parameter related to the HARQ feedback may be differently or independently operated/configured from the closed-loop transmission power control operation/parameter related to the PSSCH and/or the PSCCH.

FDM of an HARQ resource may be allowed or configured only for reception UEs having a distance from the transmission UE receiving the HARQ feedback within a pre-determined threshold value. FDM of an HARQ resource may be allowed or configured only for reception UEs having an SL pathloss difference for a link between the transmission UE and the reception UE within a predetermined threshold value. FDM of an HARQ resource may be allowed or configured only for reception UEs having an SL RSRP difference for a link between the transmission UE and the reception UE within a predetermined threshold value. FDM of an HARQ resource may be allowed or configured only for reception UEs having an SL RSRQ difference for a link between the transmission UE and the reception UE within a predetermined threshold value.

If a distance between each of the multiple reception UEs and the transmission UE is within a pre-configured threshold value, the multiple reception UEs may transmit HARQ feedback via a resource multiplexed using FDM on the frequency axis. If a pathloss difference between each of the multiple reception UEs and the transmission UE is within a pre-configured threshold value, the multiple reception UEs may transmit HARQ feedback via a resource multiplexed using FDM on the frequency axis. If a (measured) RSRP value difference between each of the multiple reception UEs and the transmission UE is within a pre-configured threshold value, the multiple reception UEs may transmit HARQ feedback via a resource multiplexed using FDM on the frequency axis. If a (measured) RSRQ value difference between each of the multiple reception UEs and the transmission UE is within a pre-configured threshold value, the multiple reception UEs may transmit HARQ feedback via a resource multiplexed using FDM on the frequency axis.

It may not be preferable to multiplex an HARQ feedback resource by using FDM among UEs or sub-groups within a group. When power control related to HARQ feedback transmission is not applied, it may not be preferable to multiplex an HARQ feedback resource by using FDM among different UEs or different sub-groups within a group. When an HARQ feedback reception power difference among different UEs or different sub-groups within a group is greater than a pre-configured threshold value, it may not be preferable to multiplex an HARQ feedback resource by using FDM among different UEs or different sub-groups within the group. When an SL pathloss difference among different UEs or different sub-groups within a group is greater than a pre-configured threshold value, it may not be preferable to multiplex an HARQ feedback resource by using FDM among different UEs or different sub-groups within the group. When an SL RSRP difference among different UEs or different sub-groups within a group is greater than a pre-configured threshold value, it may not be preferable to multiplex an HARQ feedback resource by using FDM among different UEs or different sub-groups within the group. When an SL RSRQ difference among different UEs or different sub-groups within a group is greater than a pre-determined threshold value, it may not be preferable to multiplex an HARQ feedback resource by using FDM among different UEs or different sub-groups within the group.

As in the above-described example, when it is not preferable to multiplex the HARQ feedback resource by using FDM, the HARQ feedback resource may be pseudo-randomly multiplexed using TDM based on at least one of a GUE_ID, an identifier related to a reception UE, an SL HARQ process ID, and/or an identifier related to a transmission UE. The HARQ feedback resource may be pseudo-randomly determined based on at least one of a GUE_ID, an identifier related to a reception UE, an SL HARQ process ID, and/or an identifier related to a transmission UE. For example, the HARQ feedback resource may be multiplexed using TDM or determined by a function having at least one of a GUE_ID, an identifier related to a reception UE, an SL HARQ process ID, and/or an identifier related to a transmission UE as an input parameter. The HARQ feedback resource may be an HARQ feedback resource for each of the reception UEs within the group. The HARQ feedback resource may be an HARQ feedback resource for each sub-group within the group. For example, the identifier related to the reception UE may correspond to a destination ID. The identifier related to the transmission UE may be a source ID. The function may be defined in advance.

A transmission UE may transmit a PSCCH and/or a PSSCH to a reception UE. The transmission UE may transmit SL information to the reception UE by using a PSCCH resource and/or a PSSCH resource. The SL information may include at least one of SL control information, SL data, an SL packet, an SL transport block (TB), an SL message, and/or an SL service.

The reception UE may determine an HARQ feedback resource. Additionally, the transmission UE may determine the HARQ feedback resource. For example, the reception UE may be one of multiple reception UEs performing groupcast communication within a group.

The HARQ feedback resource may be determined based on at least one of the PSCCH resource, the PSSCH resource, and/or the GUE_ID. When the multiple reception UEs within a group feeds back an HARQ ACK or HARQ NACK to the transmission UE by using different PSFCH resources, the multiple reception UEs within the group may determine the HARQ feedback resource by using the GUE_ID. The resource may include at least one of a time domain resource, a frequency domain resource, and/or a code domain resource. The GUE_ID may correspond to information for identifying a UE within the group.

The reception UE may transmit HARQ feedback to the transmission UE. The reception UE may transmit HARQ feedback corresponding to the PSCCH and/or the PSSCH to the transmission UE. For example, the reception UE may transmit the HARQ feedback to the transmission UE by using an HARQ feedback resource, which is determined based on at least one of the PSCCH resource, the PSSCH resource, and/or the GUE_ID.

When the reception UE successfully receives the PSCCH and/or the PSSCH, the HARQ feedback may be an HARQ ACK. When the reception UE fails to receive the PSCCH and/or the PSSCH, the HARQ feedback may be at least one of an HARQ NACK and/or discontinuous detection (DTX).

When a transmission UE selects a PSSCH and/or PSCCH transmission resource through a sensing operation, a problem of a collision between HARQ feedback transmission-related resources may not occur. When multiple transmission UEs select different PSSCH and/or PSCCH transmission resources through a sensing operation, the HARQ feedback resource may be determined based on a PSSCH resource and/or PSCCH resource. Therefore, among the UEs each having selected different PSSCH and/or PSCCH transmission resources based on the sensing operation, a collision between the HARQ feedback resources may be automatically avoided.

When the transmission UE transmits the same PSSCH and/or PSCCH to multiple reception UEs within the group, the multiple reception UEs may determine an HARQ feedback resource by using different GUE_IDs. Therefore, even though the multiple reception UEs within the group have received the same PSSCH and/or PSCCH, a collision between the HARQ feedback resources may be prevented.

FIG. 21 illustrates an example of a procedure of transmitting or receiving HARQ feedback for a PSCCH and/or a PSSCH in groupcast SL communication.

Referring to FIG. 21, an ID for identifying a UE within a group may be allocated/designated to multiple UEs within the group. The ID may be referred to as an inner ID. The inner ID may have the same purpose as or may be the same parameter as the GUE_ID. For example, for specific groupcast traffic, an application layer may transfer information on the inner ID of the UE and information on the number of UEs within a group to a V2X layer. The UE may be a UE transmitting the specific groupcast traffic. For specific groupcast traffic, the application layer may not transfer information on an inner ID of another UE within the group to the V2X layer. For example, the groupcast traffic may include at least one of a groupcast service, groupcast data, a groupcast packet, and/or a groupcast message.

When a transmission UE intends to transmit first traffic related to groupcast to multiple reception UEs within a group, an application layer of the transmission UE may transfer information on an inner ID of the transmission UE and information on the number of UEs within the group to a V2X layer of the transmission UE. An application layer of reception UE 1 may transfer information on an inner ID of reception UE 1 and information on the number of UEs within the group to a V2X layer of reception UE 1. An application layer of reception UE 2 may transfer information on an inner ID of reception UE 2 and information on the number of UEs within the group to a V2X layer of reception UE 2. An application layer of reception UE 3 may transfer information on an inner ID of reception UE 3 and information on the number of UEs within the group to a V2X layer of reception UE 3. An application layer of reception UE 4 may transfer information on an inner ID of reception UE 4 and information on the number of UEs within the group to a V2X layer of reception UE 4.

In addition, the V2X layer of the UE may transfer information on an inner ID of the UE and information on the number of UEs within the group to an AS layer of the UE. Additionally, for example, the V2X layer of the UE may transfer an L2 ID (e.g., a source L2 ID or a destination L2 ID), QoS information, and/or the like together to the AS layer of the UE.

A transmission UE may transmit specific groupcast traffic to multiple reception UEs (S2110). The specific groupcast traffic may be transmitted via a PSSCH and/or a PSCCH.

The multiple reception UEs may determine an HARQ feedback resource (S2120). Each of the multiple reception UEs (e.g., an AS layer of each of the multiple reception UEs) may determine the HARQ feedback resource for the specific groupcast traffic, based on information on its inner ID and information on the number of UEs within the group according to a pre-defined rule.

The transmission UE may determine the HARQ feedback resource (that needs to be received by the transmission UE). The transmission UE may derive or determine HARQ feedback resources of the multiple reception UEs related to the specific groupcast traffic, based on information on its inner ID and information on the number of UEs within the group.

When an application layer provides information on the inner ID of the UE and information on the number of UEs within the group to a V2X layer of the UE, the UE may determine or consider one of groupcast option 1 and groupcast option 2 as a (selectable) HARQ feedback option for the specific groupcast traffic. The V2X layer of the UE may determine or consider one of groupcast option 1 and groupcast option 2 as a (selectable) HARQ feedback option for the specific groupcast traffic. Additionally, according to whether a pre-configured condition is satisfied, the UE may finally determine or consider one of groupcast option 1 and groupcast option 2 as an HARQ feedback option for the specific groupcast traffic. When the respective HARQ feedback resources for multiple reception UEs participating in the groupcast are all supported in the resource pool, the UE may finally determine or consider groupcast option 2 as the HARQ feedback option for the specific groupcast traffic. When the respective HARQ feedback resources for multiple UEs participating in the groupcast are not all supported in the resource pool, the UE may finally determine or consider groupcast option 1 as the HARQ feedback option for the specific groupcast traffic. The determination may be performed in the AS layer of the UE.

When the application layer does not provide the information on the number of UEs within the group to the V2X layer of the UE, the UE may determine or consider groupcast option 1 as the HARQ feedback option for the specific groupcast traffic. When the application layer does not provide the information on the inner ID of the UE and/or information on the number of UEs within the group to the V2X layer of the UE, the UE may determine or consider groupcast option 1 as the HARQ feedback option for the specific groupcast traffic. For example, the V2X layer of the UE may determine or consider groupcast option 1 as the HARQ feedback option for the specific groupcast traffic.

When the application layer and/or the V2X layer provides information on the inner ID of the UE and information on the number of UEs within the group to the AS layer of the UE, the UE may determine or consider one of groupcast option 1 and groupcast option 2 as a (selectable) HARQ feedback option for the specific groupcast traffic. The AS layer of the UE may determine or consider one of groupcast option 1 and groupcast option 2 as a (selectable) HARQ feedback option for the specific groupcast traffic. Additionally, according to whether a pre-configured condition is satisfied, the UE may finally determine or consider one of groupcast option 1 and groupcast option 2 as an HARQ feedback option for the specific groupcast traffic. When the respective HARQ feedback resources for multiple UEs participating in the groupcast are all supported in the resource pool, the UE may finally determine or consider groupcast option 2 as the HARQ feedback option for the specific groupcast traffic. When the respective HARQ feedback resources for multiple UEs participating in the groupcast are not all supported in the resource pool, the UE may finally determine or consider groupcast option 1 as the HARQ feedback option for the specific groupcast traffic. The determination may be performed in the AS layer of the UE.

When the application layer and/or the V2X layer does not provide the information on the number of UEs within the group to the AS layer of the UE, the UE may determine or consider groupcast option 1 as the HARQ feedback option for the specific groupcast traffic. When the application layer and/or the V2X layer does not provide the information on the inner ID of the UE and/or information on the number of UEs within the group to the AS layer of the UE, the UE may determine or consider groupcast option 1 as the HARQ feedback option for the specific groupcast traffic. For example, the AS layer of the UE may determine or consider groupcast option 1 as the HARQ feedback option for the specific groupcast traffic.

Whether at least one of groupcast option 1 and/or groupcast option 2 is supported may be signaled to the UE, specifically for a resource pool. Whether at least one of groupcast option 1 and/or groupcast option 2 is supported may be signaled, specifically for a resource pool, to the UE for each service type, cast type, or QoS requirement. Whether a PSFCH resource related to groupcast option 1 is configured may be signaled, specifically for a resource pool, to the UE for each service type, cast type, or QoS requirement. Whether a PSFCH resource related to groupcast option 2 is configured may be signaled, specifically for a resource pool, to the UE for each service type, cast type, or QoS requirement.

The transmission UE may receive HARQ feedback from the multiple reception UEs. The transmission UE may receive groupcast option 1-based HARQ feedback from the multiple reception UEs. For example, the transmission UE may receive groupcast option 2-based HARQ feedback from the multiple reception UEs.

A specific groupcast option-based HARQ feedback operation may be required for specific groupcast traffic. When the reliability requirement related to the service is high and the transmission UE transmits the corresponding service to the reception UE, the reception UE is required to perform a groupcast option 2-based HARQ feedback operation. When the reception UE performs a groupcast option 1-based HARQ feedback operation for the service, a DTX problem may occur, and therefore, the reception UE is required to perform a groupcast option 2-based HARQ feedback operation for a service having a high reliability requirement. The DTX problem may be a problem where the transmission UE misinterprets that the reception UE has successfully received the PSCCH and the PSSCH, while the reception UE has actually failed to receive the PSCCH and does not transmit a NACK to the transmission UE. Due to the DTX problem, it may be difficult to satisfy the reliability requirement of the service. Therefore, when a specific groupcast option is not supported in the resource pool and a specific groupcast option is not supported for the corresponding traffic and/or service, the transmission UE may perform a blind re-transmission operation. When a PSFCH resource related to a specific groupcast option is not configured, the transmission UE may perform a blind re-transmission operation. The transmission UE may perform re-transmission without receiving the HARQ feedback from the reception UE.

The present disclosure provides a sidelink transmission method so that UEs performing NR sidelink communication, co-existing with UEs performing LTE sidelink communication can perform stable transmission and reception when the UEs operating LTE sidelink communication and NR sidelink communication co-exist in a co-channel and a base station allocates a resource for SL transmission to the UEs operating NR sidelink communication.

In mode 1 of an NR sidelink resource allocation method, a base station schedules a resource for sidelink transmission for the UE. NR sidelink resource allocation mode 1 collectively refers to a scheduling scheme of performing sidelink resource allocation through a sidelink dynamic grant and sidelink resource allocation through a configured grant. The sidelink dynamic grant is a scheme in which the UE receives, from the base station, scheduling of a resource of corresponding transmission at every transmission using a sidelink. The sidelink configured grant is a scheme in which in a case where the UE receives a configuration of a specific cycle from the base station, when the UE has traffic to be transmitted by the UE through a sidelink by using time and frequency resources configured from the base station at every cycle, the UE performs transmission through a resource periodically configured by the corresponding configured grant. For the sidelink configured grant, two types corresponding to Type 1 and Type 2 may be used as in the same scheme used in the conventional NR system, transmission through a configured grant activated in the RRC is Type 1, and transmission of activating a grant configured via DCI is Type 2.

FIGS. 22 and 23 illustrate an example of an automatic gain control (AGC) problem that may occur in an LTE sidelink terminal when the LTE sidelink terminal coexists with an NR sidelink terminal on a co-channel.

Specifically, FIGS. 22 and 23 illustrate problems that may occur, during an AGC process, in a terminal performing LTE sidelink communication when LTE sidelink terminal(s) and NR sidelink terminal(s) coexist on a co-channel, wherein the LTE sidelink terminal is configured with a 15 kHz SCS and the NR sidelink terminal is configured with a 30 kHz SCS. For example, FIG. 22 illustrates a problem that may occur when two NR sidelink transmission terminals perform transmission using one slot each, where the two NR slots overlap an LTE subframe. This example assumes a situation in which, from the perspective of an LTE sidelink reception terminal, reception power for NR sidelink transmission terminal #1 is lower than reception power for NR sidelink transmission terminal #2. The LTE sidelink subframe format performs AGC on symbol #0, so in the case of FIG. 22, an LTE sidelink reception terminal performs AGC in consideration of only the reception power for the NR sidelink transmission terminal #1. That is, since the LTE sidelink reception terminal performed AGC without considering the reception power for the NR sidelink transmission terminal #2, ADC saturation occurs when the NR sidelink transmission terminal #2 performs transmission. For example, FIG. 23 illustrates a problem that may occur while an LTE sidelink reception terminal performs AGC when one NR sidelink transmission terminal performs transmission by using only the second of two consecutive NR slots that overlap an LTE subframe. Similarly, since the LTE sidelink reception terminal performs AGC on symbol #0 of the LTE sidelink subframe format, the LTE sidelink reception terminal may not consider transmission power of an NR sidelink terminal performed in the second slot that overlaps the LTE subframe. Therefore, when the NR sidelink terminal performs transmission in the slot, the LTE sidelink reception terminal may also experience an ADC saturation problem.

To solve this problem, when an NR sidelink terminal coexists with LTE sidelink terminal(s) on a co-channel, the NR sidelink terminal may transmit a PSSCH through multi-slot transmission or slot aggregation by using all slots that overlap the LTE subframe. When an NR sidelink terminal performs resource selection for transmission resources, resource selection for NR sidelink can be performed in units of time intervals occupied by an LTE subframe, i.e., in interval units of consecutive NR slots overlapping the LTE subframe, during a time interval in which dynamic resource sharing with an LTE sidelink terminal occurs. To this end, the NR sidelink terminal may be configured to be scheduled, in NR sidelink mode 1, by a base station in interval units of consecutive NR slots overlapping an LTE subframe, and may be configured to, in NR sidelink mode 2, receive a resource pool configured in interval units of consecutive NR slots overlapping the LTE subframe.

That is, when SCS configured on a terminal (e.g., an NR sidelink terminal) through an RRC configuration information is different from SCS configured on a legacy terminal (e.g., an LTE sidelink terminal) through the RRC configuration information, one transmission frame for the legacy terminal may overlap multiple slots of the NR terminal. In this case, an AGC is performed through the first symbol of each subframe and a slot, and thus the legacy terminal may not consider AGC for the remaining slots, other than the first slot, among slots that overlap one subframe of the legacy terminal. For example, when co-channel coexistence operation, in which a legacy terminal, having an SCS configured to be 15 kHz through RRC configuration information, and a terminal, having an SCS configured to be 30 kHz, coexist on a co-channel, is performed, one legacy subframe of the legacy terminal overlaps two slots of the NR terminal. In this case, AGC in the second slot cannot be considered by the legacy terminal, and thus transmission in the second slot may interfere with the legacy terminal.

Therefore, to solve this problem, the present disclosure proposes a method for controlling the transmission power between terminals coexisting on a co-channel. Specifically, when the SCS of an NR sidelink terminal performing a co-channel coexistence operation in which the NR sidelink terminal and an LTE sidelink terminal coexist on a co-channel has a value greater than the SCS of an LTE side terminal, multiple slots and a subframe for transmission by the legacy terminal may overlap (for example, when the SCS of the LTE sidelink terminal is set to 15 kHz, and when the SCS of the NR sidelink terminal is set to 30 kHz, one legacy subframe overlaps two slots.).

In this case, the NR sidelink terminal may limit the transmission power of second and subsequent slots according to transmission power of the first slot for reception by the LTE sidelink terminal. For example, the transmission power of the second and subsequent slots may be configured so as not to be greater than the transmission power of the first slot (e.g., the transmission power in the second and subsequent slots may be configured to have a value equal to or smaller than that of the transmission power in the first slot). That is, the transmission power of the second and subsequent slots may be configured within a transmission power range of the first slot.

FIG. 24 illustrates an example in which when NR sidelink terminal(s) and LTE sidelink terminal(s) coexist on a co-channel according to an embodiment of the present disclosure, the NR sidelink terminal performs multi-slot transmission or slot aggregation.

FIG. 24A illustrates the case where, when NR sidelink terminal(s) and LTE sidelink terminal(s) coexist on a co-channel, the LTE sidelink terminal is configured with a 15 kHz SCS and the NR sidelink terminal is configured with a 30 kHz SCS. In this case, since one LTE subframe overlaps two consecutive NR slots, the NR sidelink terminal may perform PSSCH/PSCCH transmission through multi-slot transmission or slot aggregation by using the two consecutive NR slots that overlap one LTE subframe.

For example, FIG. 24B illustrates that when NR sidelink terminal(s) and LTE sidelink terminal(s) coexist on a co-channel, the LTE sidelink terminal is configured with a 15 kHz SCS, and the NR sidelink terminal is configured with a 60 kHz SCS. In this case, since one LTE subframe overlaps four consecutive NR slots, the NR sidelink terminal may perform PSSCH/PSCCH transmission through multi-slot transmission or slot aggregation by using the four consecutive NR slots that overlap the one LTE subframe.

If the NR sidelink terminal performs multi-slot transmission or slot aggregation in the coexistence, channel on which the NR sidelink terminal coexist with the LTE sidelink terminal(s), to transmit one or more PSSCH(s)/PSCCH(s), an NR sidelink reception terminal that receives the PSSCH (s)/PSCCH(s) may perform PSFCH transmission to an NR sidelink transmission terminal by using up to four PRBs in one NR PSFCH occasion.

FIG. 25 illustrates an example in which an NR sidelink terminal transmits four PSFCHs by using four PRBs according to an embodiment of the present disclosure.

Specifically, on the coexistence channel of an NR sidelink and an LTE sidelink terminal, when the NR sidelink terminal is configured with a 30 kHz SCS, the NR sidelink terminal may select two consecutive NR slots, which overlap one LTE subframe, to perform PSSCH/PSCCH transmission through slot aggregation or multi-slot transmission. FIG. 25 illustrates a situation in which one NR sidelink terminal selects four consecutive NR slots for PSCCH/PSSCH transmission, thereby performing multi-slot transmission or slot aggregation. According to the NR PSFCH transmission rules, an NR sidelink reception terminal transmits a PSFCH by using one PRB for a PSCCH and a PSSCH received in one slot. Therefore, in FIG. 26, the NR sidelink reception terminal must transmit four PSFCHs to one NR sidelink transmission terminal by using four PRBs.

When multiple PSFCHs are transmitted using multiple PRBs in one NR PSFCH occasion, the maximum transmission power that a terminal can emit is limited, so PSFCH transmission power for each PSFCH may be transmitted using lower transmission power than when PSFCH transmission is performed using only one PRB. This may cause damage in terms of coverage and reduce the reliability of HARQ feedback transmission. To solve this problem, the present disclosure proposes a method for performing PSFCH transmission using one PRB by multiplexing HARQ feedback for PSCCH and PSSCH transmissions that occur in two consecutive slots when an NR sidelink terminal performs PSSCH/PSCCH transmission through multi-slot transmission or slot aggregation.

First, the present disclosure proposes a method for selecting the time-frequency resources of a PRB used in PSFCH transmission. There may be three methods for selecting the time-frequency resources of a PRB used in PSFCH transmission. FIG. 26 illustrates a method for selecting time-frequency resources of a PRB to be used for PSFCH transmission when performing the PSFCH transmission by multiplexing two types of HARQ feedback.

FIG. 26 illustrates an example of a method for selecting time-frequency resources of a PRB to be used for PSFCH transmission when performing the PSFCH transmission by multiplexing two types of HARQ feedback according to an embodiment of the present disclosure.

Referring to FIG. 26, when the period of a PSFCH occasion is two slots, when the minimum gap from PSSCH reception to associated PSFCH transmission is two slots, and when a candidate resource configured for the frequency resource of a PSFCH includes subchannels allocated to the PSSCH, an NR sidelink terminal may select the time-frequency resources of a PRB for PSFCH transmission when transmitting a PSSCH by performing multi-slot transmission or slot aggregation.

Specifically, FIG. 26A illustrates a method for selecting, when NR PSSCH transmission is performed using two consecutive slots, time-frequency resources of a PRB to be used for PSFCH transmission, based on a PSSCH transmitted in the first slot. In FIG. 26A, an NR PSSCH transmission terminal performs multi-slot transmission or slot aggregation by using slots #0 and #1. An NR PSSCH reception terminal selects time-frequency resources of a PRB to be used for PSFCH transmission, based on a PSSCH received in the first slot of the two consecutive slots. Therefore, the NR PSSCH transmission terminal has performed PSSCH transmission using subchannels #0 and #1 in the first slot, slot #0, and thus the NR PSSCH reception terminal may determine that a candidate PRB time-frequency resource set is some PRBs which are included in subchannels #0 and #1.

FIG. 26B illustrates a method in which, when NR PSSCH transmission has been performed using two consecutive slots, a terminal that receives an NR PSSCH and transmits an NR PSFCH selects time-frequency resources of a PRB to be used for PSFCH transmission, based on a PSSCH which has been most recently received. In FIG. 26B, an NR PSSCH transmission terminal performs multi-slot transmission or slot aggregation by using slots #0 and #1. An NR PSSCH reception terminal selects time-frequency resources of a PRB to be used for PSFCH transmission, based on a PSSCH in a most recently received slot among two consecutive slots. Therefore, the NR PSSCH reception terminal has received the PSSCH by using subchannel #0 in slot #1, and thus the NR PSSCH reception terminal may determine that a candidate PRB time-frequency resource set is some PRBs included in subchannel #0.

FIG. 26C illustrates a method in which, when NR PSSCH transmission has been performed using two consecutive slots, a terminal that receives an NR PSSCH transmitted in two slots and transmits an NR PSFCH selects time-frequency resources of a PRB to be used for PSFCH transmission, based on the PSSCH received in the two slots. In FIG. 26C, an NR PSSCH transmission terminal performs multi-slot transmission or slot aggregation by using slots #0 and #1. An NR PSSCH reception terminal selects time-frequency resources of a PRB to be used for PSFCH transmission, based on a PSSCH transmitted in the two consecutive slots used for the transmission. Therefore, when the PSSCH is received from the NR PSSCH transmission terminal by using subchannels #0 and #1 in slot #0 and subchannel #0 in slot #1, the NR PSSCH reception terminal may determine that a candidate PRB time-frequency resource set is all PRBs in subchannel #0 and some PRBs included in subchannel #1.

when a candidate PRB time-frequency resource set to be used for PSFCH transmission is determined using the above method, a terminal determines time-frequency resources of a PRB to be used for PSFCH transmission by using a method of selecting time-frequency resources of a PRB by using a reception terminal ID and a transmission terminal ID, which is the PRB indexing method defined in the standard.

Second, the present disclosure relates to a method for selecting resources in a code domain when multiplexing two types of HARQ feedback for PSCCH and PSSCH transmission that occurred in two consecutive slots.

FIG. 27 illustrates examples of cyclic shifts applied to one PRB transmitted when a PSFCH transmission terminal performs PSFCH transmission using the one PRB by multiplexing two types of HARQ feedback according to an embodiment of the present disclosure.

FIG. 27A illustrates examples of cyclic shift values applied to multiplexed HARQ feedback when one cyclic shift pair that a PSFCH transmission terminal can use is configured. In this case, the PSFCH format used can be a format defined in the existing NR sidelink operation. In the existing NR sidelink operation, when a terminal has been configured to have one cyclic shift pair that can be used for PSFCH transmission, a cyclic shift value of 0 is applied to NACK feedback, and a cyclic shift value of 6 is applied to ACK feedback, that is, when HARQ-ACK feedback is 1 bit, the difference in cyclic shift index between ACK and NACK is applied as 6, thereby performing PSFCH transmission. The present disclosure proposes a method for transmitting one or more HARQ-ACK feedback bits through HARQ-ACK multiplexing. FIG. 27A illustrates an example of cyclic shift values that can be applied when an NR sidelink terminal multiplexes and transmits two HARQ feedback bits for coexistence with an LTE sidelink terminal. This method is a method for setting the difference in the cyclic shift index to 3, based on information of two different types of HARQ feedback. If feedback that a terminal needs to transmit is NACK feedback and NACK feedback with respect to feedback for a PSSCH transmitted in the first slot and feedback for a PSSCH transmitted in the second slot, the terminal may apply 0 to a cyclic shift to perform PSFCH transmission. If feedback that the terminal needs to transmit is ACK feedback and NACK feedback, 3 may be applied as a cyclic shift value. If feedback that the terminal needs to transmit is NACK feedback and NACK feedback, 6 may be applied as the cyclic shift value. If the feedback that the terminal needs to transmit is NACK feedback and ACK feedback, 9 may be applied as a cyclic shift value. The cyclic shift value applied in this case is an example value, and a different value can be applied depending on the type of HARQ feedback to be transmitted.

For example, FIG. 27B illustrates an example of cyclic shift values applied to multiplexed HARQ feedback, when two cyclic shift pairs usable by a PSFCH transmission terminal are configured, when the PRB selection process for PSFCH transmission using IDs of a transmission terminal and a reception terminal in an NR sidelink is followed, and when the initial value for determining a cyclic shift are determined to be 0 and 1. If the initial value is determined to be 0, the terminal may use values of (0, 1, 6, 7), as cyclic shift values to be applied to a PRB, to transmit HARQ feedback of ((NACK, NACK), (ACK, NACK), (ACK, ACK), (NACK, ACK)). In this case, the values of (0, 1, 6, 7) are exemplary, and may be replaced with various values such as (0, 2, 6, 8), (0, 5, 6, 11), (0, 4, 6, 10) and a combination of HARQ feedback. If the initial value is determined to be 1, the terminal may use values of (3, 4, 9, 10), as cyclic shift values to be applied to a PRB, to transmit HARQ feedback of ((NACK, NACK), (ACK, NACK), (ACK, ACK), (NACK, ACK)). Similarly, the applied cyclic shift values and combinations of HARQ feedback types may be replaced with other values.

FIG. 27C illustrates examples of a cyclic shift applied to multiplexed HARQ feedback, when three cyclic shift pairs usable by a PSFCH transmission terminal are configured, when the PRB selection process for PSFCH transmission using IDs of a transmission terminal and a reception terminal in an NR sidelink is followed, and when the initial value for determining a cyclic shift is determined to be 0, 1, or 2. If six cyclic shift pairs that the NR sidetrack terminal can use for PSFCH transmission are configured, this case may follow the case where three cyclic shift pairs are configured. If the initial value is determined to be 0, the terminal may use values of (0, 3, 6, 9), as cyclic shift values to be applied to a PRB, to transmit HARQ feedback of ((NACK, NACK), (ACK, NACK), (ACK, ACK), (NACK, ACK)), respectively. The mapping is an example, so HARQ feedback types mapped to respective cyclic shift value may be different. If the initial value is determined to be 1, the terminal may use values of (2, 5, 8, 11), as cyclic shift values to be applied to a PRB, to transmit HARQ feedback of ((NACK, NACK), (ACK, NACK), (ACK, ACK), (NACK, ACK)). Similarly, the mapping is exemplary, so HARQ feedback types mapped to respective cyclic shift values may be different. If the initial value is determined to be 2, the terminal may use values of (4, 7, 10, 1), as cyclic shift values to be applied to a PRB, to transmit HARQ feedback of ((NACK, NACK), (ACK, NACK), (ACK, ACK), (NACK, ACK)). Similarly, the mapping is exemplary, so HARQ feedback types mapped to respective cyclic shift values may be different.

If an NR sidelink terminal performs multi-slot transmission or slot aggregation for a PSCCH and a PSSCH on a coexistence channel on which NR sidelink terminal coexists with LTE sidelink terminal(s), and if an NR sidelink transmission terminal performs transmission using different levels of transmission power in different slots, an LTE sidelink reception terminal may still experience the above-described problem in an AGC process. Therefore, if the NR sidelink terminal performs multi-slot transmission or slot aggregation, the NR sidelink terminal may be configured to perform transmission using the same transmission power in all NR slots that overlap one LTE subframe. The present disclosure proposes a method for adjusting PSCCH and PSSCH transmission power when the NR sidelink terminal performs multi-slot transmission or slot aggregation for a PSCCH and a PSSCH on a coexistence channel with the LTE sidelink terminal(s).

When an NR sidelink terminal performs multi-slot transmission or slot aggregation for coexistence with LTE sidelink terminal(s), the NR sidelink terminal may be configured to apply transmission power, used for PSSCH transmission in the first slot among all consecutive NR slots overlapping one LTE subframe, to PSSCH transmission in the remaining NR slots. That is, PSSCH transmission power to be used in the remaining slots except for the first slot, among the NR slots overlapping with the one LTE subframe, is configured to be equal to PSSCH transmission power to be used in the first slot. In this case, if the PSCCH transmission is performed in one symbol, PSCCH transmission power may be determined depending on the ratio of the number of PRBs occupied by the PSCCH and the PSSCH in the symbol according to a method defined in the standard.

FIG. 28 illustrates an example of a method for adjusting transmission power when an NR sidelink terminal performs multi-slot transmission or slot aggregation according to an embodiment of the present disclosure.

Referring to FIG. 28, when the SCS of an NR terminal is configured to be 30 kHz through RRC configuration information, and when the SCS of a legacy terminal (e.g., an LTE sidelink terminal, etc.) is configured to be 15 kHz through the RRC configuration information, one subframe for PSSCH or PSCCH transmission by the legacy terminal may overlap two slots for PSSCH or PSCCH transmission by the NR terminal. In this case, the NR terminal may limit transmission power for PSSCH or PSCCH transmission in the second slot, based on transmission power in the first slot.

Specifically, an NR sidelink terminal may limit transmission power in the second and subsequent slots based on transmission power in the first slot for reception by an LTE sidelink terminal. For example, transmission power in the second and subsequent slots may be configured so as not to be greater than transmission power in the first slot (for example, transmission in the second and subsequent slots may be configured to have a value equal to or smaller than that of transmission power in the first slot). That is, the transmission power in the second and subsequent slots may be configured within the transmission power range of the first slot.

That is, as illustrated in FIG. 28, AGC in a 15 kHz subframe is performed only in the first symbol, and thus the LTE sidelink terminal may not consider AGC of the NR sidelink terminal in the second slot. Therefore, in the case of the NR sidelink terminal, Tx power $P_{n+1}$, which is transmission power in the second slot (NR slot #n+1), may be limited based on Tx power $P_n$, which is transmission power in the first slot (NR slot #n). That is, the transmission power in the second slot may be configured to have a value equal to or lower than that of the transmission power in the first slot.

FIG. 29 illustrates another example of a method for adjusting transmission power when an NR sidelink terminal performs multi-slot transmission or slot aggregation according to an embodiment of the present disclosure.

Specifically, FIG. 29 illustrates that when an NR sidelink terminal is configured with a 60 kHz SCS and multi-slot transmission or slot aggregation is performed for PSSCH transmission, transmission power calculated and used in the first slot among NR slots overlapping one LTE subframe is also applied in the remaining slots. That is, since transmission power calculated and used in slot #0 is also used in slot #1, slot #2, and slot #3, the terminal does not need to separately calculate transmission power to be used in slot #1, slot #2, and slot #3.

If the NR sidelink terminal performs multi-slot transmission or slot aggregation for coexistence with LTE sidelink terminal(s), transmission power to be used for an NR slot, in which a high-priority PSSCH is transmitted, among all NR slots overlapping one LTE subframe, may also be applied to transmission in the remaining NR slots. NR PSSCH transmission power is dependent on the priority of a PSSCH to be transmitted and a CBR measured before an N-slot. If the priority of the PSSCH to be transmitted is high, that is, if the priority value of SCI transmitted in the same slot as the PSSCH to be transmitted is low, transmission power may not be significantly reduced even when the channel busy ratio (CBR) measured before the N-slot is high, thereby ensuring transmission of high-priority traffic. On the contrary, if the priority of the PSSCH to be transmitted is low, that is, if the priority value of the SCI transmitted in the same slot as the PSSCH to be transmitted is high, transmission power may be reduced when the CBR measured before the N-slot is high, thereby reducing the high CBR. Therefore, when the NR sidelink terminal performs multi-slot transmission or slot aggregation for coexistence with the LTE sidelink terminal, the NR sidelink terminal may select, as transmission power in each of consecutive NR slots that overlap one LTE subframe, the maximum power from transmission power in slots in which a PSSCH with the highest priority is transmitted, to perform PSCCH and PSSCH transmission.

FIG. 30 illustrates examples of slot states before/after transmission power is adjusted when an NR sidelink terminal performs multi-slot transmission or slot aggregation according to an embodiment of the present disclosure.

Specifically, FIG. 30A illustrates transmission power calculated by an NR sidelink terminal based on a PSSCH transmission power calculation method when the NR sidelink terminal performs multi-slot transmission or slot aggregation for PSCCH and PSSCH transmission. When the calculated transmission power is used as is, transmission power in each slot is different, and thus an LTE sidelink reception terminal may not reflect transmission power for slots after slot #1 in an AGC process, thereby causing an ADC saturation problem.

FIG. 30B illustrates an example in which the above-described transmission power adjustment method has been applied. Since the priority value of a PSSCH transmitted in slot #1 and slot #2 is the lowest, an NR sidelink terminal selects the maximum value of transmission power to be used in slot #1 and slot #2, and selects the selected value as transmission power in all slots overlapping with an LTE subframe to perform PSSCH transmission. In this case, from the perspective of an LTE sidelink reception terminal, reception power within one LTE subframe is constant, so an ADC saturation problem does not occur.

FIG. 31 illustrates an example of a resource configuration for NR PSCCH/PSSCH transmission when an NR sidelink terminal coexists with LTE sidelink terminal(s) on a co-channel according to an embodiment of the present disclosure.

Specifically, FIG. 31 illustrates an example in which an NR sidelink terminal selects both slots from two NR slots (slot #n and slot #n+1), which overlap LTE subframe #m, to perform NR PSCCH/PSSCH transmission. In To prevent a problem due to AGC of an LTE sidelink terminal, the NR sidelink terminal maintains NR PSCCH/PSSCH transmission power, which is to be transmitted in slot #n+1, at a level equal to or less than that of NR PSCCH/PSSCH transmission power to be transmitted in slot #n. The NR sidelink terminal may repeatedly transmit, in slot #n+1, the same TB as a TB transmitted in slot #n. Alternatively, the NR sidelink terminal may transmit, in slot #n+1, a TB different from the TB transmitted in slot #n.

If the NR sidelink terminal repeatedly transmits the same TB when performing NR PSCCH/PSSCH transmission using two consecutive slots overlapping one LTE subframe, the NR sidelink terminal may drop or re-select the transmission in the second overlapping slot when transmission in the first overlapping slot is dropped or re-selected due to pre-emption, etc.

If the NR sidelink terminal transmits different TBs when performing NR PSCCH/PSSCH transmission using two consecutive slots overlapping one LTE subframe, the NR sidelink terminal may perform transmission in the second overlapping slot as is in some case even when transmission in the first overlapping slot is dropped or transmission resource reselection is performed. Specifically, when the NR sidelink terminal is equipped with both an NR sidelink module and an LTE sidelink module, the NR sidelink terminal will be able to decode transmission from another LTE sidelink terminal and measure the value of RSRP. When the other LTE sidelink terminal reserves LTE subframe resources that overlap in a time domain and a slot in which the NR sidelink terminal intends to perform transmission, and measures received LTE PSCCH and/or LTE PSSCH RSRP which contain reservation information, and when the corresponding LTE SL RSRP measurement value does not exceed a configured threshold, the NR sidelink terminal may perform NR PSCCH/PSSCH transmission in the second slot of the two slots overlapping one LTE subframe, even when NR PSCCH/PSSCH transmission in the first slot is dropped or reselection is performed. The configured threshold may be configured differently depending on the priority of received LTE sidelink transmission and the priority of NR sidelink transmission to be transmitted by the terminal, and may be configured in the form of a list according to each priority.

FIG. 32 illustrates an example of a method for PSCCH/PSSCH transmission by an NR sidelink terminal when the NR sidelink terminal coexists with LTE sidelink terminal(s) on a co-channel according to an embodiment of the present disclosure.

Referring to FIG. 32, when an NR sidelink terminal coexists with the LTE sidelink terminal(s) on a co-channel and is configured with a 30 kHz SCS, the NR sidelink terminal may perform reselection or a drop of transmission in an overlapping slot.

Specifically, FIG. 32 illustrates a situation in which an NR sidelink terminal performs NR PSCCH/PSSCH transmission in two consecutive NR slots that overlap one LTE subframe. This situation shows a situation in which first NR sidelink transmission that overlaps with one LTE subframe is dropped when the NR sidelink terminal intends to transmit different TBs. In this case, when LTE sidelink transmission is scheduled in the LTE subframe that overlaps with the slot in which the transmission is to be performed, and when an LTE SL RSRP measured by an LTE sidelink module mounted on the NR sidelink terminal is smaller than a configured threshold value, the NR sidelink terminal may perform NR PSCCH/PSSCH transmission (i.e., TB2 transmission) in a second overlapping slot as is.

If an NR sidelink terminal transmits different TBs when performing NR PSCCH/PSSCH transmission using two slots overlapping one LTE subframe, the NR sidelink terminal may, when determining whether to drop transmission in the first slot or perform transmission resource reselection, determine the drop of transmission in the first slot or the reselection, based on the higher priority between the priority of a TB scheduled for transmission in a first overlapping slot and the priority of a TB scheduled for transmission in a second overlapping slot. If the drop or reselection of transmission in the first slot overlapping with the one LTE subframe is determined, the terminal shall not perform transmission in the second slot overlapping with the LTE subframe, but shall perform drop or transmission resource reselection for the transmission.

That is, when the NR sidelink terminal coexists with the LTE sidelink terminal on a co-channel and when the SCS is configured differently, and multiple NR slots overlap one legacy subframe, the NR sidelink terminal may perform drop or resource reselection in the multiple overlapping slots in consideration of the priority of the overlapping slots or the priority of the first slot. In this case, the drop or resource reselection in the multiple slots may be performed slot by slot, or the drop or reselection may be performed identically in all slots.

For example, when the second slot among the overlapping slots has the lowest priority, drop or reselection in all slots may be performed based on the priority of the second slot. Alternatively drop or reselection in all slots may be performed based on the priority of the first slot.

FIG. 33 illustrates another example of a method for PSCCH/PSSCH transmission by an NR sidelink terminal when the NR sidelink terminal coexists with LTE sidelink terminal(s) on a co-channel according to an embodiment of the present disclosure.

Referring to FIG. 33, when an NR sidelink terminal coexists with LTE sidelink terminal(s) on a co-channel and has been configured with a 30 kHz SCS, the NR sidelink terminal may perform drop or reselection based on a slot having the highest priority among slots.

Specifically, FIG. 33 illustrates a situation in which an NR sidelink terminal performs NR PSCCH/PSSCH transmission in two consecutive NR slots that overlap one LTE subframe. This situation shows a situation in which the NR sidelink terminal intends to transmit different TBs in each NR slot. FIG. 33A shows that an NR sidelink terminal intends to transmit different TBs in two consecutive NR slots (slot #n, slot #n+1) that overlap one LTE subframe. It is shown that the priority value of TB1 transmitted in slot #n is 7, and the priority value of TB2 transmitted in slot #n+1 is 3. It is shown that as the priority value decreases, the priority is higher. Therefore, TB2 with a priority value of 3 has a higher priority than TB1 with a priority value of 7. FIG. 33B illustrates the process of determining whether to perform transmission resource reselection or drop of sidelink transmission for transmitting TB1 in slot #n when an NR sidelink terminal must perform uplink transmission with a priority value of 5 in slot #n. To determine whether to perform sidelink transmission, the terminal uses the priority value of 3, which is the higher priority of the priorities of TB1 and TB2, to determine whether to drop TB1 transmission or perform transmission resource reselection. This has a priority which is higher than 5, which is the priority value of uplink transmission, so the terminal may, in slot #n, perform NR PSCCH/PSSCH transmission (i.e., TB1 transmission) without performing uplink transmission. The terminal has performed the PSCCH/PSSCH transmission in slot #n, and may therefore also perform PSCCH/PSSCH transmission (i.e., TB2 transmission) in slot #n+1.

FIG. 34 is a flowchart illustrating an example of a method for PSSCH transmission by an NR sidelink terminal according to an embodiment of the present disclosure.

Referring to FIG. 34, when performing co-channel coexistence operation in which an NR sidelink terminal and an LTE sidelink terminal (a legacy terminal) coexist on a co-channel, the NR sidelink terminal may adjust transmission power in slots overlapping one subframe of the LTE sidelink terminal, based on transmission power in the first slot.

Specifically, the NR sidelink terminal may receive configuration information for configuring a first subcarrier spacing (SCS) for multiple slots (S34010) and may transmit a physical sidelink shared channel (PSSCH) in the multiple slots (S34020).

In this case, when the terminal coexists with the legacy terminal on a co-channel and the multiple slots overlap entirely a legacy subframe of the legacy terminal, second transmission power in at least one slot, other than the first slot, among the multiple slots may be limited by first transmission power in the first slot.

In this case, the first subcarrier spacing is larger than a second subcarrier spacing configured in the legacy subframe. For example, the first subcarrier spacing may be 30 kHz, and the second subcarrier spacing may be 15 kHz.

Furthermore, in this case, the second transmission power may be configured to have a value not greater than the first transmission power, and the multiple slots may include two slots. The first symbol of the multiple slots is a symbol for automatic gain control.

When uplink transmission is scheduled in the first slot among the multiple slots, whether to drop the transmission of the PSSCH in the first slot among the multiple slots may be determined based on a transport block having the highest priority among transport blocks for the multiple slots.

The above-mentioned description of the present disclosure is for illustrative purposes, and it will be understood that those who skilled in the art to which the present disclosure belongs can easily modify the present disclosure in other specific forms, without altering the technical ideas or essential characteristics of the present invention. Therefore, the embodiments described above are illustrative and are not limited in all aspects. For example, each element described as a single entity may be distributed and implemented, and likewise, elements described as being distributed may also be implemented in a combined form.

The scope of the present disclosure is defined by the appended claims rather than the above detailed description, and all changes or modifications derived from the meaning and range of the appended claims and equivalents thereof should be interpreted as being included within the scope of the present disclosure.

The invention claimed is:

1. A terminal configured to operate in a wireless communication system, the terminal comprising:
a communication module; and
a processor configured to control the communication module,
wherein the processor is configured to:
receive configuration information for configuring a first subcarrier spacing (SCS) for multiple slots; and
transmit physical sidelink shared channel (PSSCH) transmissions in the multiple slots, and
wherein in case that the terminal coexists with a legacy terminal on a co-channel and the PSSCH transmissions in multiple slots overlap with a legacy subframe of the legacy terminal in a time domain, a second transmission power in at least one slot, other than a first slot, among the multiple slots for the PSSCH transmissions is configured to have a value that is not greater than a first transmission power in the first slot among the multiple slots for the PSSCH transmissions.

2. The terminal of claim 1, wherein the first subcarrier spacing is larger than a second subcarrier spacing configured in the legacy subframe.

3. The terminal of claim 2, wherein the first subcarrier spacing is 30 kHz, and
wherein the second subcarrier spacing is 15 kHz.

4. The terminal of claim 1, wherein the terminal supports a NR (new radio) sidelink communication system, and the legacy terminal supports a LTE (long term evolution) sidelink communication system.

5. The terminal of claim 1, wherein the multiple slots comprise two slots.

6. The terminal of claim 1, wherein a starting symbol in each slot of the multiple slots comprises a symbol for automatic gain control.

7. The terminal of claim 1, wherein whether to drop the transmission of the PSSCH in the first slot is determined based on a transport block having the highest priority among transport blocks for the PSSCH transmissions in the multiple slots.

8. A method for use by a terminal of a wireless communication system, the method comprising:
receiving configuration information for configuring a first subcarrier spacing (SCS) for multiple slots; and
transmitting a physical sidelink shared channel (PSSCH) transmissions in the multiple slots,
wherein in case that the terminal coexists with a legacy terminal on a co-channel and the PSSCH transmissions in multiple slots overlap with a legacy subframe of the legacy terminal in a time domain, a second transmission power in at least one slot, other than a first slot, among the multiple slots for the PSSCH transmissions is configured to have a value that is not greater than a first transmission power in the first slot among the multiple slots for the PSSCH transmissions.

9. The method of claim 8, wherein the first subcarrier spacing is larger than a second subcarrier spacing configured in the legacy subframe.

10. The method of claim 9, wherein the first subcarrier spacing is 30 kHz, and
wherein the second subcarrier spacing is 15 kHz.

11. The method of claim 8, wherein the terminal supports a NR (new radio) sidelink communication system, and the legacy terminal supports a LTE (long term evolution) sidelink communication system.

12. The method of claim 8, wherein the multiple slots comprise two slots.

13. The method of claim 8, wherein a starting symbol in each slot of the multiple slots comprises a symbol for automatic gain control.

14. The method of claim 8, wherein whether to drop the transmission of the PSSCH in the first slot is determined based on a transport block having the highest priority among transport blocks for the PSSCH transmissions in the multiple slots.

* * * * *